US009168573B2

(12) United States Patent
Hojaji

(10) Patent No.: US 9,168,573 B2
(45) Date of Patent: Oct. 27, 2015

(54) PRODUCTS MADE FROM BIOMASS AND METHOD OF MAKING THE SAME

(75) Inventor: Hamid Hojaji, Rockville, MD (US)

(73) Assignee: Hamid Hojaji, Kensington, MD (US)

(*) Notice: Subject to any disclaimer, the term of this patent is extended or adjusted under 35 U.S.C. 154(b) by 261 days.

(21) Appl. No.: 13/545,333

(22) Filed: Jul. 10, 2012

(65) Prior Publication Data

US 2014/0013554 A1    Jan. 16, 2014

(51) Int. Cl.
*B09B 3/00* (2006.01)
*B09B 5/00* (2006.01)
*A61G 17/08* (2006.01)

(52) U.S. Cl.
CPC ... *B09B 3/00* (2013.01); *B09B 5/00* (2013.01); *A61G 17/08* (2013.01)

(58) Field of Classification Search
CPC ............ B09B 3/00; B09B 5/00; A61G 17/08; A61G 99/00; A61G 2017/00; C12P 7/6409; E04H 13/008
USPC .......... 27/1; 428/542.4; 588/318; 241/1, 301; 435/134; 40/124.5
See application file for complete search history.

(56) References Cited

U.S. PATENT DOCUMENTS

| | | | | |
|---|---|---|---|---|
| 1,640,680 | A * | 8/1927 | Vanderlaan | 428/542.2 |
| 5,016,330 | A * | 5/1991 | Botsch | 27/1 |
| 5,987,720 | A * | 11/1999 | Yamamoto | 27/35 |
| 6,170,136 | B1 * | 1/2001 | Wilson-Brokl | 27/1 |
| 6,200,507 | B1 * | 3/2001 | Dennis | 264/73 |
| 6,382,111 | B1 * | 5/2002 | Hojaji | 110/341 |
| 6,615,463 | B1 * | 9/2003 | Hojaji | 27/1 |
| 7,228,602 | B2 * | 6/2007 | Weisbrot et al. | 27/1 |
| 7,266,866 | B2 * | 9/2007 | Vogel et al. | 27/1 |
| 8,627,555 | B2 * | 1/2014 | Kennedy | 27/1 |
| 8,931,147 | B2 * | 1/2015 | Sullivan | 27/2 |
| 2002/0025392 | A1 * | 2/2002 | Yardley et al. | 428/3 |
| 2003/0154581 | A1 * | 8/2003 | Jain et al. | 27/1 |
| 2009/0077779 | A1 * | 3/2009 | Zimmerman et al. | 27/1 |
| 2009/0266108 | A1 * | 10/2009 | Balme et al. | 63/1.11 |
| 2010/0005835 | A1 * | 1/2010 | Johnson et al. | 63/36 |
| 2010/0199476 | A1 * | 8/2010 | Cummings et al. | 27/1 |
| 2012/0102693 | A1 * | 5/2012 | Royal | 27/3 |
| 2013/0295624 | A1 * | 11/2013 | Medoff et al. | 435/134 |
| 2014/0366342 | A1 * | 12/2014 | Fenton et al. | 27/2 |

FOREIGN PATENT DOCUMENTS

CH        695319 A1     3/2006
CN    201101669 B1     8/2008

(Continued)

OTHER PUBLICATIONS

International Search Report dated Dec. 5, 2013, in corresponding International Application No. PCT/IB2013/056395.

*Primary Examiner* — William Miller

(57) ABSTRACT

A product comprises a combination of a plurality of recovered materials, and at least one precursor material, an interaction between biomass and at least one fluid providing the plurality of recovered materials, the biomass being of animal or human origin, the at least one fluid in interaction with the biomass provides at least one of degradation of a plurality of organic molecules comprised by the biomass, and breakage of a plurality of protein bonds comprised by the biomass, and the combination of the plurality of recovered materials and the at least one precursor material forms the product into a solid object.

18 Claims, 5 Drawing Sheets

(56) References Cited

FOREIGN PATENT DOCUMENTS

CN 101428784 A1 5/2009
RU 2443749 C1 2/2012
WO 94/15766 A1 7/1994

* cited by examiner

PRODUCTS MADE FROM BIOMASS AND METHOD OF MAKING THE SAME

FIELD OF THE INVENTION

The present invention relates generally to methods that facilitate the environmentally conscious conversion of biomass into products, and to products integrating biomass. More particularly, the present invention is directed to the conversion of human and animal biomass remains or biomass originally derived from a human and animal into a plurality of finite objects, and to the finite objects obtained via said method of conversion.

THE BACKGROUND OF THE INVENTION

Every year vast quantities of biomass are produced that are finally disposed via conventional methods. In the art and as well in the present document, by the term "biomass" is understood, in a broad manner, an organism that once lived, or a part of an organism that once lived, or a part of an organism that is currently living, that organism being of plant, animal or human origin.

Various methods are currently known for the final disposition of biomass, such as interment, thermal cremation, hydrothermal processing such as alkaline hydrolysis, laser ablation, and others. Thermal cremation methods are characterized by a relatively high $CO_2$ foot print, and emission of potentially hazardous gaseous species into the environment, especially toxic volatile metals such as mercury. Further, regardless of the method used, the known disposition methods produce solids and fluids that might present potential environmental hazards if directly released into the environment without any further due treatment, since they contain organic and inorganic species that may negatively impact the milieu, specifically the air, the ground and the drain system.

Upon the termination of a final disposition, by thermal cremation or by hydrothermal processing, especially in the case of human remains or animal remains, family members, and owners closest to the disposed elect to receive keepsake remains, consisting mainly of powdered bone fragments that are placed in an urn or other enclosures. The powdered bone fragments placed in an urn or other enclosures are prone to be dispersed and lost, if the holder (urn, or other enclosures) is breached or broken.

To alleviate some of the environmental impact, as related to $CO_2$ emission for example, disposition methods, such as the alkaline hydrolysis method, is are being introduced. The alkaline hydrolysis method is a hydrothermal process using an aqueous alkaline solution to aggressively dissolve the biomass in a relatively short time. The alkaline hydrolysis method is characterized by a lower $CO_2$ foot print as compared to a thermal cremation, and practically no emission of hazardous gaseous species into the environment, but at the same time it presents a different environmental hazard which is associated with the generation and uncontrolled release of potentially hazardous untreated effluents.

Regardless of the environmental issues, posed by the process that originates them, the keepsake remains made from bone fragments provided by both the alkaline hydrolysis process and the thermal cremation, suffer the same faith, they are prone to be lost if the urn or the enclosure holding them is breached or broken. In addition, loose powders do not carry any esthetic or artistic value.

Alkaline materials, specifically strong alkaline solutions made with a strong base, react with the biomass to liquefy and/or emulsify the biomass. In the process, especially if the biomass comprises human or animal remains, the reaction dissolves the proteins, and emulsifies the oils and fat comprised by the biomass. During the process of dissolution, the alkaline solution, as it reacts with the proteins, denatures them. The denaturation of proteins involves the disruption and destruction of the bio-structures. As a result, once the proteins are dissolved, the structure of the biomass disintegrates, and in the presence of water, it liquefies. During this process, the alkaline solution separates the fats into glycerin and fatty acids. Further, alkali metals comprised in the alkaline solution combine with the separated fatty acids, and the result is a crude soapy liquid. The above processing is strongly accelerated if the reaction is carried out under hydrothermal conditions.

In the process of reacting a biomass containing bone materials with alkaline solutions, upon completion of liquefaction and/or emulsification as described above, the bone fragment materials such as skeleton bone members are at least partially left behind. In a typical mammal such as a human, a substantial portion of bone is primarily made up of hydroxyapatite, a calcium phosphate mineral. In a typical thermal cremation (involving direct flame), the remains after cremation are also bone fragments of the same mineral composition in addition to other organic and inorganic residues such as calcium carbonate, and various carbonaceous materials.

In the process of reacting a biomass with a hydroxide as adapted to dispose human remains and pet carcasses in an alkaline hydrolysis process, the human remains, or the pet carcass is placed into an autoclave, along with a predetermined volume of an aqueous alkaline solution, such as solutions of potassium hydroxide or sodium hydroxide. The autoclave is operated at a typical temperature of 130-195° C. for about 2-3 hours. As a result, the organic matter liquefies into a brownish liquid/sludge effluent, and bone fragments remain over a grid like member, physically separating them from the effluent. Operating the autoclave for longer times further reduce the amount of remaining bone fragment materials. As mentioned above, the hydrothermal conditions provided by autoclaving accelerate the reaction significantly.

As mentioned above, the alkaline hydrolysis is currently an alternative for thermal cremation. During thermal cremation the biomass is incinerated at high temperatures, causing the evaporation of water from the biomass and the destruction of organic matter, leaving behind inorganic bone fragment materials, a fraction of residual carbonaceous materials, carbonates, other materials and airborne particulates that are normally captured and filtered out by an off gas treatment system. In a thermal cremation process, normally gas burners provide heat and a combustion environment in an incinerator. Volatile metals, such as mercury that may exist in a cadaver's dental work, are also volatilized during incineration and can be emitted out into the atmosphere if not captured in the off-gas treatment equipment.

Although the alkaline hydrolysis disposition method presents several advantages over thermal cremation, such as lower $CO_2$ foot print, and lesser emissions of hazardous gaseous species, it generates an effluent that contains organics, and various dissolved and suspended solids. The effluent, when released untreated causes at least organic pollution, since it may contain cross linked amino-acid side chains that could be potentially harmful to humans and animals, in addition to fats and nucleic acids in a multiplicity of combinations.

The solids left over from an alkaline hydrolysis disposition, usually consisting of bone fragments, are crushed or ground into powder form, placed in a container and delivered to the family and friends of the deceased. The same applies to the solids recovered from a thermal cremation disposition. However, the solids recovered from the thermal cremation also include undesired organic and/or inorganic species. To further process and/or handle the solids recovered from thermal cremation disposition it may be necessary to further treat the recovered solids with a fluid to substantially remove the undesired portion/portions. In the process, an effluent is generated that may need to be treated before being released. The effluent may be a gaseous, air, a liquid, a solid or combination thereof.

Therefore, to summarize, the art as currently available presents a plurality of problems, such as:

The solid materials originating from a thermal cremation disposition or from an alkaline hydrolysis disposition, when powdered and placed in an urn or other enclosure, are prone to be dispersed and lost, if their holder is breached or broken;

The effluents produced by both thermal cremation and alkaline hydrolysis potentially pose danger to the environment if released untreated;

The solids originating from thermal cremation disposition may comprise portions that are undesirable, either because they are hazardous or because they cause degradation of a solid product that is to be made from these solids;

In case neither cremation or alkaline hydrolysis are elected for a final disposition of a human or animal, the opportunity of creating permanent memorialization products is lost when the human or animal origin biomass is buried;

Finding solutions to the above highlighted problems is increasingly relevant in the context of increasing world population and agglomeration of urban areas. Novel and improved solutions are necessary to deal with the final disposition of biomass, and to provide permanent and durable memorialization products for the biomass irrespective what was the mode elected for its final disposition, be it either cremation, burial, alkaline hydrolysis or others.

None of the methods currently known in the art solves the problem of how to safely dispose into the environment the effluents resulting from either thermal cremation and alkaline hydrolysis. Should the case be that the choice is not to dispose of the effluents but to convert the effluents into a keepsake, none of the available art teaches how to create from the effluent a safe, value added product that may be used to memorialize the deceased. In addition, the art does not teach how to memorialize via a product, part of a living human or animal or a deceased human or animal that is to be buried.

BRIEF SUMMARY OF THE INVENTION

To address at least the above referenced problems, the present invention proposes a product, in accordance with one aspect of the present invention, that comprises a combination of a plurality of recovered materials, and at least one precursor material. The plurality of recovered materials is provided by an interaction between biomass and at least one fluid.

Preferably the precursor material comprises one of a plurality of solid forming precursors, a plurality of composite forming precursors, a plurality of articles, and a combination thereof. The product in accordance with the present invention comprises one of a shaped article, an art form, an ornamental form, a functional article capable of being used to perform a function, a non-functional article, a multifunctional article, a block, an abstractive article, a decorative article, an article capable of providing aesthetics, and a combination thereof.

The present invention proposes as well a method for forming a product, that in accordance with another aspect of the present invention comprises interacting a biomass and at least one fluid to provide a plurality of recovered materials, combining the plurality of recovered materials with at least one precursor material to create a pre-processed product, and processing the created pre-processed product to form the product.

The method may, in accordance with further aspects of the invention, further comprise the step of recovering a plurality of solids from a plurality of effluents resulting from the interaction between the biomass and at least one fluid, the step of recovering a plurality of solids from a gaseous effluent resulting from the interaction between biomass and at least one fluid, or the steps of recovering an effluent resulting from the interaction between biomass and at least one fluid, recovering a solid effluent and a liquid effluent from said effluent, recovering solids from the liquid effluent to create a solids depleted liquid effluent, and treating and disposing of the solids depleted liquid effluent.

The present invention further proposes a system, comprising a combination of a plurality of products capable of creating the system, the plurality of products comprising at least a first product and a second product. The first product comprises a combination of a plurality of first recovered materials, said plurality of first recovered materials being provided by an interaction between a first biomass and at least one fluid, and at least one precursor material. The second product comprises a combination of a second plurality of recovered materials and a second precursor material, and the plurality of second recovered materials is provided by an interaction between a second biomass and at least one fluid, and the second precursor material comprises the first product.

The described product, method and system solve the problems encountered in the art, such as how to produce durable and stable long lasting memorialization products, how to manage in an environmentally conscious manner the effluents resulting from the known disposition methods, how to remove the undesirable portions of the effluents and how to recover solids from the effluents resulting from the known disposition methods.

BRIEF DESCRIPTION OF THE DRAWINGS

The above and other aspects, features and advantages of the present invention will be more apparent from the following more particular description thereof, presented in conjunction with the following drawings, wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

In accordance with the present invention by "a combination of" is understood a variety of elements that are associated with each other in a manner that is specific to the requirements of an embodiment of the invention. The association of elements may be carried out exemplarily by at least one of the following combining methods: mixing, blending, brushing, spraying, drawing, encapsulating, joining, fusing, covering, coating, and embedding. Other combining techniques may be as well be practiced to realize "a combination of". The present invention requires that at least a plurality of recovered materials in combination with at least one precursor material form the claimed product. As such, in accordance with the present invention by a product comprising a combination of is understood a product wherein the plurality of recovered materials and the at least one precursor material are associated with each other using one of the techniques stated above or any other technique that is suitable.

Figure 1:
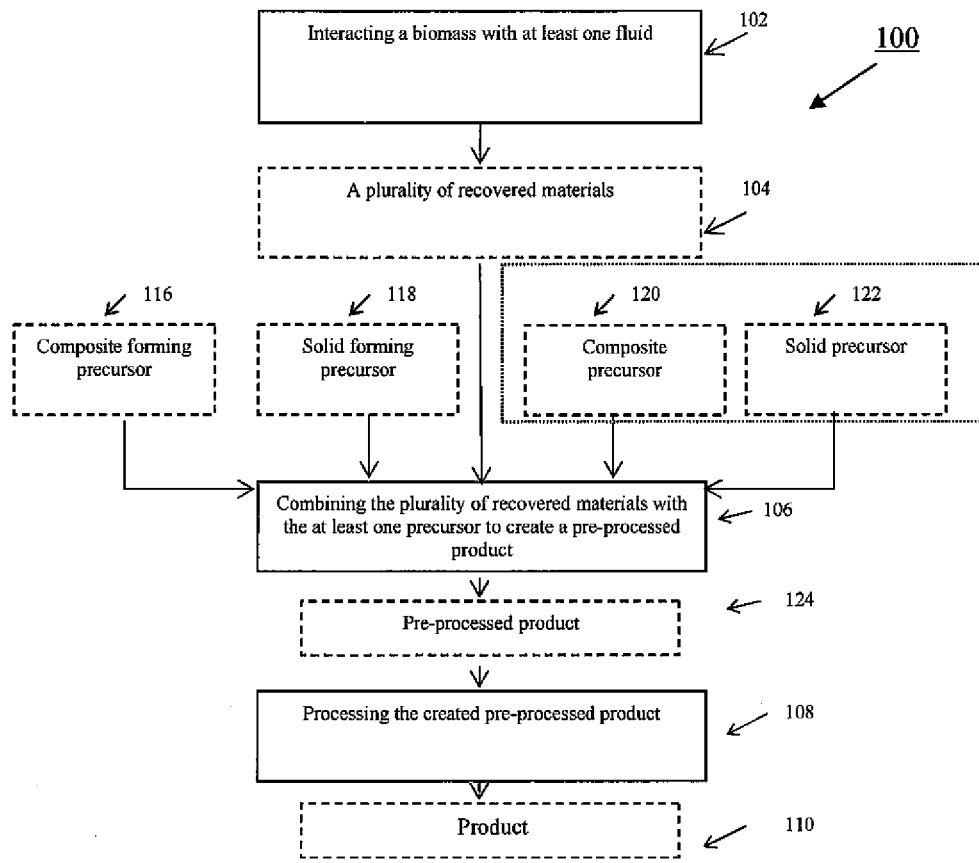
FIG. 1 is a block diagram showing an embodiment of the method for forming a product, in accordance with an embodiment of the present invention.

Referring now to FIG. 1, FIG. 1 is a block diagram showing an embodiment of the method for forming a product, in accordance with an embodiment of the present invention.

The method 100 represented in FIG. 1 comprises bringing, in a first step 102, a biomass in contact with at least one fluid, the biomass and the at least one fluid interacting to create a plurality of recovered materials 104. The plurality of recovered materials 104 comprises, in accordance with one embodiment of the present invention a single material. Alternatively, in accordance with another embodiment of the invention, the plurality of recovered materials 104 comprises multiple materials. For the sake of clarity it is mentioned herewith that in the following the terms "recovered materials" "a single recovered material" and "a plurality of recovered materials" are used interchangeably and are given the same meaning as stated bellow. It must be understood that the amount of recovered materials available in most cases is governed/determined by the crematories and the outfits that stage cremation and/or alkaline hydrolysis functions.

By "recovered materials" or by "a plurality of recovered materials" in accordance with the present invention is understood a plurality of process product materials, materials that are provided by an interaction between a biomass and at least one fluid. The interaction between the biomass and at least one fluid is at least one of a chemical interaction, a physical interaction, a thermal interaction, a mechanical interaction, a high temperature reaction, a wet oxidation reaction, a dissociation reaction, a dissolution action, a dissolving action, a rinsing action, a soaking action, a spraying action, a washing action, a dedusting action, a cleaning action, a drying action, a physical removal action, a size reducing action, a separating action, a chemical interaction with gases and vapors, a physical interaction with gases and vapors, an interaction with steam, a combustive interaction, and a combination thereof. The chemical, physical, and thermal interaction comprises one of an interaction with fluids under atmospheric conditions, an interaction with fluids under hydrothermal conditions, an interaction with fluids under supercritical conditions, an interaction under hydrothermal conditions with a plurality of alkaline solutions, and an interaction under hydrothermal oxidizing conditions with a plurality of alkaline solutions. A physical process according to the present invention may also be a mechanical process, a radiation process and a thermal process.

As it will be described in detail in the following portions of this document, the plurality of recovered materials 104 comprises at least one of a plurality of solid materials, a solid effluent recoverable from an effluent resulting from the interaction between biomass and at least one fluid, a plurality of solids recovered from a liquid effluent recoverable from an effluent resulting from the interaction between biomass and at least one fluid, and a plurality of solids recovered from a gaseous effluent resulting from the interaction between biomass and at least one fluid.

As previewed above, the step 102 of interacting a biomass with at least one fluid may consist exemplarily of one of a chemical interaction, of a physical interaction, a high temperature reaction, a wet oxidation reaction, a dissociation reaction, a dissolution action, a dissolving action, a freeze drying action, a rinsing action, a soaking action, a spraying action, a washing action, a dedusting action, a cleaning action, a drying action, a physical removal action, a separating action, an interaction with air, gases and vapors, an interaction with steam, a combustive interaction, and a combination thereof.

The chemical and/or physical interaction comprise at least one of an interaction with fluids under atmospheric conditions, an interaction with fluids under hydrothermal conditions, an interaction with fluids under vacuum, an interaction with fluids under supercritical conditions, an interaction under hydrothermal conditions with a plurality of alkaline solutions, and an interaction under hydrothermal oxidizing conditions with a plurality of alkaline solutions.

The fluid comprises at least one of a plurality of liquids, gases, vapors, air, and a combination thereof.

In accordance with the present invention by "biomass" is understood at least one of human or animal derived tissue, a human cadaver, human remains, a plurality of bone fragments, a plurality of materials of human origin, an animal carcass, cremation ash, cremation remains, articles and parts originating from a human or animal, and a combination thereof. What is understood by biomass in accordance with the present invention will be described in more detail further in this document in connection with various embodiments of the present invention. In accordance with the present invention the biomass comprises a plurality of parts of human or animal origin, the human or the animal being alive at a time of collecting the plurality of parts. Exemplarily, the plurality of parts comprises hair, nail clippings, placenta, human or animal derived matters, and others. Further, in accordance with the present invention the biomass comprises a plurality of parts of human or animal origin, wherein the human or the animal are to be buried in ground. It is envisioned in accordance with the invention that said plurality of parts are to be collected prior to the in-ground burial or the cremation of said human or animal subject. As such, the opportunity to memorialize the subject is preserved despite its interment.

The at least one fluid that is brought into interaction with the biomass may be at least one of a gaseous, a vapor, air, an alkaline solution, an aqueous solution, water, steam, water vapor, ammonia, an acidic solution, a plurality of organic solvents, a plurality of amino acids, oxidizers such as hydrogen peroxide, oxygen, carbonates, bicarbonates, salts, soaps, and combination thereof. The above list of fluids is not exhaustive, and it is considered that any substance in liquid, gas, or vapor form capable of degrading the organic molecules comprised by the biomass and/or capable of breaking the protein bond within the biomass is included within the scope of the present invention into the generic denomination of "at least one fluid". Exemplarily the fluids may also be in the form of liquids, slurries, gases, air, vapors, and a combination thereof. In the following in the present document the terms "fluid", "at least one fluid" and any other reference to a fluid will be used interchangeably and will assume the meaning stated above. In accordance with the present invention wherein the at least one fluid comprises gas, the gas may comprise nitrogen, carbon dioxide, oxygen, and a combination thereof. In accordance with the present invention wherein the at least one fluid comprises vapor, the vapor may comprise steam, water, vapor, ammonia, and a combination thereof. In accordance with the present invention wherein the at least one fluid comprises aerosol, the aerosol may comprise degreasing sprays, disinfecting sprays, antibacterial sprays, and a combination thereof. In accordance with the present invention wherein the at least one fluid comprises liquid, the liquid may comprise an alkaline solution, an acidic solution, a liquid capable of destructing tissues, a plurality of organic solvents, a plurality of amino acids, hydrogen peroxide, carbonates, bicarbonates, salts, soaps, water and a combination thereof.

The interaction taking place between the biomass and the at least one fluid that is brought in contact with the biomass should be understood as any interaction process that leads to the degradation and/or removal of the organic and inorganic molecules comprised by the biomass, or to the transformation of the biomass into a plurality of recovered materials useable for subsequent processing into a plurality of products, or to the destruction and/or transformation of the tissues, and related matters. It is also the objective of the present invention to minimize or eliminate the negative environmental impact that may be created by the release of any solids and fluids resulting from the interaction. Fluids, according to the meaning associated within the scope of the present invention include liquids, slurries, gases, vapors, air, aerosols, and combination thereof. Exemplarily the gases comprise air, nitrogen, carbon dioxide, oxygen, and a combination thereof. The vapor comprises steam, water vapor, ammonia, and a combination thereof. The aerosol comprises degreasing sprays, disinfecting sprays, antibacterial sprays, and a combination thereof. The liquid comprises an alkaline solution, an acidic solution, a liquid capable of destructing tissues, a plurality of organic solvents, a plurality of amino acids, hydrogen peroxide, carbonates, bicarbonates, salts, soaps, water, and a combination thereof.

As a result of the interaction taking place between the biomass and the at least one fluid, a plurality of recovered materials 104 are formed.

As it will be discussed in detail further in this document and at least in connection with FIG. 2, the plurality of recovered materials 104 comprises at least one of a plurality of a primary solid material, a solid effluent, a solid recovered/extracted or recouped from a liquid effluent, a solid recovered/extracted or recuperated from a gaseous effluent, and a combination thereof. An optional recovered solid portion of processed liquid effluent may also be included in the plurality of recovered materials 104. Hence, the term solid also applies to a plurality of solid particles, solid fragments, solid pieces, and combination thereof.

In accordance with the method 100 for forming a product in accordance with one embodiment of the present invention, in a first step 102, biomass is interacted with at least one fluid to create a plurality of recovered materials 104. In a second step 106 the plurality of recovered materials 104 resulting from the above described interaction 102 between the biomass and the at least one fluid, is brought into contact, and combined with at least one precursor material to create a pre-processed product. The at least one precursor material according to the present invention is at least one of a plurality of composite forming precursors 116 capable of forming a plurality of pre-processed composite solid products in combination with the plurality of recovered materials, a plurality of solids forming precursors 118, capable of forming a plurality of pre-processed solid products in combination with the plurality of recovered materials, a plurality of composite precursors 120, alternatively referred to as a plurality of articles capable of receiving the plurality of recovered materials, or equally capable of integrating the plurality of recovered materials, or equally capable of incorporating the recovered materials, to form a plurality of pre-processed composite solid products, and a plurality of solid precursor materials 122, alternatively referred to as solid articles capable of receiving the recovered materials, or equally capable of integrating the recovered materials, or equally capable of incorporating the recovered materials, and to form a plurality of pre-processed solid products. In a third step 108 of method 100, the pre-processed product created as described above is processed to form a product 110.

In an exemplary embodiment of the invention, the plurality of materials 104 recovered from the interaction of the biomass and at least one fluid are combined with one of a plurality of composite forming precursors to create a composite pre-processed product. Similarly, the plurality of recovered materials 104 is combined with solids forming precursors to create a plurality of solid pre-processed products at step 106. The combining process takes place in a manner that is selected commensurate with the desired homogeneity and/or the desired physical form of the resulting a solid product 110. In other words, the resulting product or products 110 created according to the method 100 may be either homogenous or heterogeneous products, depending on the state of the plurality of recovered materials 104. The plurality of recovered materials 104 may be homogenously situated, or heterogeneously situated on or within the final product 110. In the case of a product 110 wherein the plurality of recovered materials 104 is heterogeneously situated either on or within the solid product, the product 110 has an easily recognizable texture and optics that identify the product as one with heterogeneous structure.

Exemplary composite forming precursor materials 116 that may be combined with the plurality of recovered materials 104 comprise a paint forming composite, a clay forming composite, a cement forming composite, a wood forming composite, a polymer forming composite, a metal forming composite, a fabric forming composite, an organic polymer forming composite, an inorganic material forming composite, a stone forming composite, a rock forming composite, a paper forming composite, a plurality of ink forming composites, a combustible material forming composite, a diamond forming composite, a reinforced fiber forming composite, a powder-binder forming composite, a polymer forming composite for filling 3D printer cartridges, and a combination thereof.

The product 110 created upon processing the combination between a composite forming precursor 116 and a plurality of recovered materials 104 may exemplarily be at least one of a painting, drawing, a composite clay object, a cementiteous composite object, a polymer composite object, a metal matrix object, a composite building material product, an ink and/or dye, a graphical object, a wood composite object, a combustible composite object, a composite material object, and many others. The list provided above is not exhaustive and in accordance with the scope of the present invention comprises any product that may be created by exercising the steps of method 100, wherein the precursor material is a composite forming precursor.

Exemplary solid forming precursor materials 118 that may be combined with the plurality of recovered materials 104 are glass forming precursor materials, ceramic forming precursor materials, glass ceramic forming precursor materials, crystal forming precursor materials, and a combination thereof. The enumeration provided above is not exhaustive and any precursor material that when combined with the plurality of recovered materials 104 leads to the formation of the product 110 in solid form is considered to be under the scope of the present invention.

Exemplary solids precursors 118 that may be combined with the plurality of recovered materials 104 are at least one of a glass, a metal or a metal alloy, a ceramic material, a clay material, a glass ceramic material, a crystal, and a mixture thereof.

The article comprises a solid object or a composite solid object, such as a glass object, a stained glass, a finished painting, and any other object that lends itself or permits the deposition on its surface of a precursor material that has already been mixed with the plurality of recovered materials.

The step 106 of combining the plurality of recovered materials 104 with the at least one precursor material 116, 118, 120, and 122 to create a pre-processed product 124 of the present invention can be carried out by a variety of techniques depending upon the type of the precursor material employed, and the physical form in which the plurality of recovered materials 104 are recovered. Exemplarily, in case the plurality of recovered materials 104 is in a dry and powdered form, at least one of the following combining methods are envisioned to be used in accordance with the present invention: mixing, blending, brushing, spraying, drawing, encapsulating, joining, covering, coating, and embedding. Other combining techniques may be as well practiced to realize the combination between the recovered materials 104 and any one of or all the precursors 116, 118, 120, and 122. Should the plurality of recovered materials 104 or the precursor materials 116, 118, 120, and 122 happen to be presented in another form than in a solid dry form, other processing steps, not mentioned above, precede or succeed the combining step 106, steps that lead to the creation of a pre-processed product 124.

The pre-processed product 124 created at step 108 is, in accordance with the method 100 of the present invention, processed in step 108 to create the product 110. The product 110 may be in a desired final state or form upon the completion of the processing step 108, or may require further secondary processing steps, that may take place after the processing step 108 to obtain a final and desired form.

The nature of the processing step 108 depends upon the type and nature of the pre-processed product 124 created at step 106. Exemplarily the processing step 108 may be a drying step, if the created pre-processed product 124 is a fresh painting (i.e. freshly painted). Other exemplarily processing step 108 to create the product 110 from the pre-processed product 124 may be various types of shaping methods, coating, heating, melting, firing, glazing, cooling, annealing, and various types of densification methods. As mentioned earlier, the type of the processing step 108 envisioned in accordance with the invention is also dependent upon the type of end product 110 desired to be formed. More specifics regarding the method 100 for forming a product, envisioned in accordance with the present invention, will be provided in connection with the particular embodiments of the present invention, in the remaining portions of this document.

Exemplarily the solid product 110 formed upon processing the pre-processed product 124 created at step 106 is at least one of a plurality of a painted surface, a clay based product, a cement based product, a polymer based composite product, a metal based product, a wood based product, a plurality of products with inked or dyed surfaces, an combustible compound composite, glass, a ceramic, a glass-ceramic, a crystalline product, a glazed product, a coated product, a fabric based product, a polymer based composite product for filling cartridge printers, a building product, an organic based product, an inorganic based product, a stone based product, rock based product, a paper based product, a resin based material, a wood product, a combustible product, and a combination thereof. Exemplarily the product 110 may be in the form of a shaped article, an art form, an ornamental form, a functional article capable of being used to perform a function, a non-functional article, a multifunctional article, a jewelry, a block, an abstractive article, a decorative article, an article capable of providing aesthetics, and a combination thereof.

Figure 2:
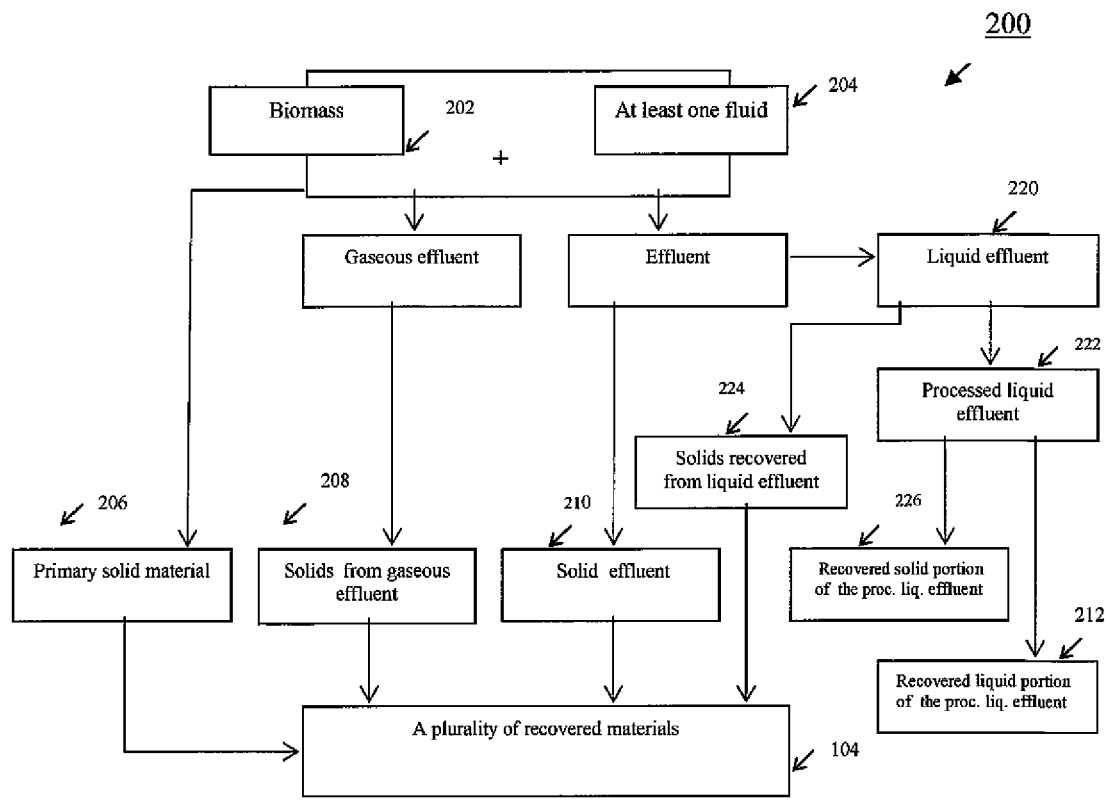
FIG. 2 is a block diagram showing a plurality of recovered materials recovered from the interaction between biomass and a plurality of fluids, in accordance with one embodiment of the present invention.

Referring now to FIG. 2, FIG. 2 is a block diagram showing a plurality of recovered materials 104 recovered from the interaction between biomass and a plurality of fluids, in accordance with one embodiment of the present invention. In accordance with FIG. 2, a plurality of recovered materials 104 comprising various solids are produced by an interaction between at least one biomass 202 and at least one of a plurality of fluids 204. The plurality of recovered materials 104 comprises at least one of: a plurality of primary solid materials 206, a plurality of solids 208 recovered or recouped from a gaseous effluent 230, a plurality of solids 210 from an effluent 240, and a plurality of solids 212 recovered/extracted or recouped from a liquid effluent 220.

The plurality of recovered materials 104 may optionally comprise all four solids 206, 208, 210, and 212 or any combination thereof. Optionally a fifth solid, which is a plurality of solids 226 recovered from a processed liquid effluent 222 may also be included in the plurality of recovered materials 104. The number and types of solids required for the plurality of recovered materials 104 depends on the type, and size of biomass 202 originally available to interact with the at least one fluid 204, the type of fluid 204 employed in the interaction, and the type of the interaction taking place between the biomass and the fluid. In some occasions, not all the solids listed above may be present. Furthermore, the size, number, and type of products 110 desired to be formed also influences which of the four solids 206, 208, 210, and 212, and the optional fifth solid 226 will be included in the make-up of the plurality of recovered materials 104.

The plurality of recovered materials 104 may be optionally subjected to a variety of optional pre-treatment/pre-processing steps such as washing, rinsing, drying, heating, oxidizing, decomposing, size reducing, classifying, and alike. These steps may occur directly upon the recovery of the materials after the interaction between the biomass and the at least one fluid. The performance of further pre-processing steps on the recovered materials 104 is dictated by their characteristics and their intended material distribution in the final product 110, into which they will be later incorporated. Each one of solids 206, 208, 210, and 212 can optionally be dried and/or pulverized before being combined with the other recovered solids to form the plurality of recovered materials 104. Alternatively, solids 206, 208, 210, and 212 can be combined as desired and then be dried and pulverized, or optionally dried, and combined, and then pulverized. The solids may also be combined in a wet state, followed by drying and if necessary, pulverizing. Alternatively, the recovered materials 104 may be in a slurry form if desired. It is set forth in accordance with the present invention that any processing step that leads to mixing, blending, and sizing is within the scope of the present invention and may be practiced without deviating from the scope of the invention. The above description is also applicable to the optional recovered solid portion 226, if present.

Exemplarily the primary solid material 206 comprises at least one of bone fragments, hair, nail, powdery or granular substances, dental fragments and devices, fragments of fabrics, medical devices, and combination thereof, that were comprised by the biomass that was subject to the interaction with the at least one fluid. The solids extracted from gaseous effluent 208 comprise solid powders filtered from a gaseous effluent 230, emitted from the interaction between the biomass and the at least one fluid, during the treatment of the gaseous effluent. A detailed discussion regarding the solids 210, 212, and 226 may be found further in this document at least in connection with the description associated with FIG. 3.

The biomass 202 subject to the interaction with the at least one fluid 204 comprises at least one of human or animal derived biomass, a human cadaver, human remains, a plurality of bone fragments, a plurality of tissue fragments of human origin, a plurality of material of human origin, an animal carcass, cremation ash, cremation remains, articles and parts originating from a deceased or living individual or animal, parts of human or animal origin, wherein said human, or said animal are alive at a time of collecting of said plurality of parts, parts of human or animal origin, wherein said human, or said animal that are to be in-ground buried, and a combination thereof.

The at least one fluid 204 that is brought into interaction with the biomass 202 may be at least one of a gas, a vapor, air, an aerosol, a liquid, and a combination thereof. The gas exemplarily comprising air, nitrogen, carbon dioxide, oxygen, the vapor exemplarily comprising steam, water vapor, ammonia, the aerosol exemplarily comprising degreasing sprays, disinfecting sprays, antibacterial sprays, and the liquid exemplarily comprising an alkaline solution, an acidic solution, a plurality of organic solvents, a plurality of amino acids, hydrogen peroxide, carbonates, bicarbonates, salts, soaps, water.

Exemplary embodiments for the alkaline solution are at least one of an aqueous solution comprising potassium hydroxide, barium hydroxide, cesium hydroxide, sodium hydroxide, strontium hydroxide, calcium hydroxide, lithium hydroxide, ammonium hydroxide, sodium carbonate, potassium carbonate and a combination thereof.

Figure 3:
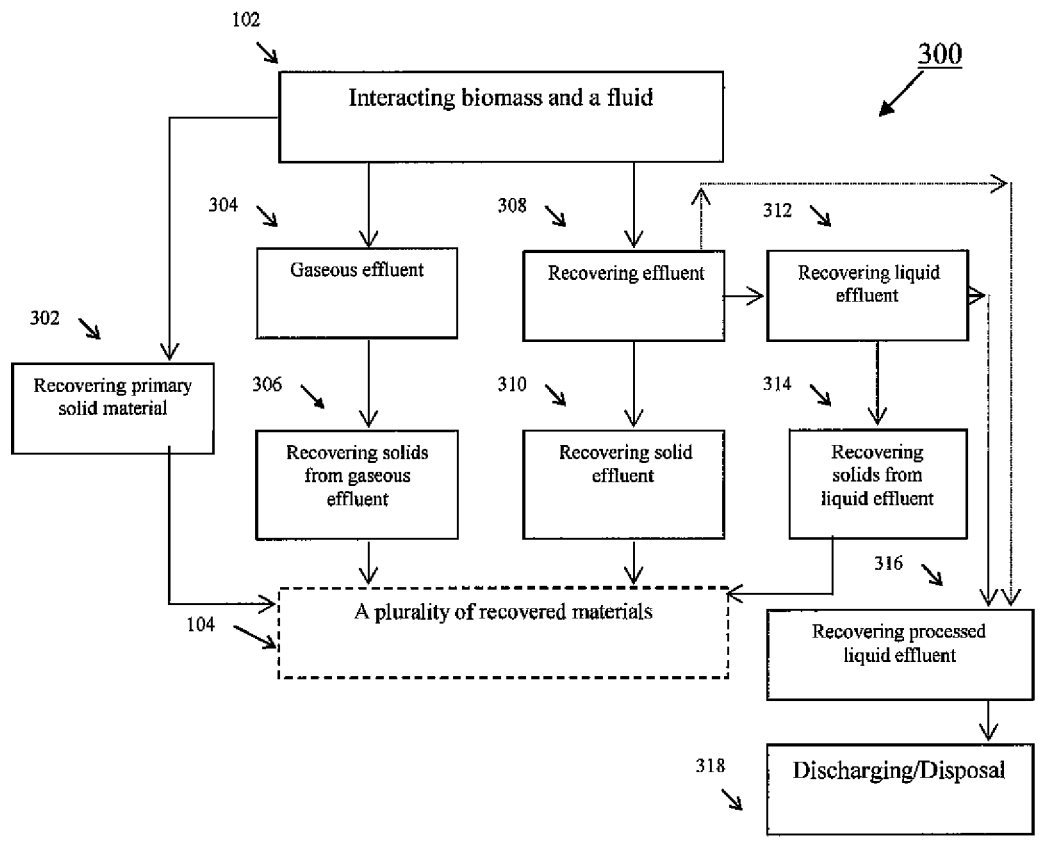
FIG. 3 is a block diagram showing another embodiment of the method for forming a product, focusing on the recovery of a plurality of recovered materials from the interaction between biomass and a plurality of fluids.

Referring now to FIG. 3, FIG. 3 is a block diagram showing another embodiment of the method for forming a product, focusing on the recovery of a plurality of recovered materials from the interaction between biomass and a plurality of fluids.

The method 300 of FIG. 3 comprises a step 102 in which a biomass 202 is interacted with at least one fluid 204. The at least one fluid 204 comprises at least one of a liquid, a slurry, a vapor, a gas, and a combination thereof. For the sake of simplicity in the following both the liquid and the slurry are termed "liquid", and air, the vapor and the gas are termed "gas" or "gaseous fluid".

When at step 102 the at least one fluid 204 is a gaseous fluid, the plurality of recovered materials 104 is recouped in at least one of steps of recovering primary solid material 302, and recovering solids from gaseous effluent 230, in step 306. According to step 306, a plurality of solids 208 are recovered from the gaseous effluent 230 resulting from the interaction between biomass 202 and the at least one fluid 204 via the off gas treatment equipment. The plurality of solids 208, may be staged in by first recovering gaseous effluent 230 in step 304, followed by step 306 recovering the solids from the gaseous effluent 230, which can be carried out directly in the off gas treatment equipment. The off gas treatment equipment may include one or more of each after-burners, blowers, prefiltration units, cyclones, catalytic oxidizers, activated carbon filters, catalytic convertors, scrubbers (both dry and wet), bag houses, electrostatic precipitators, HEPA filtration units, and ID fans.

When at step 102 the at least one fluid 204 is a liquid, in addition to the primary solid 206 recovered in step 302, the process optionally creates an effluent 240 that is recovered in step 308. The effluent 240 comprises a liquid effluent portion 220, and optionally a solid effluent portion 210. In case the effluent is not hazardous, or it is not required for further use due to the fact that the quantity of the primary solid material 206 recovered is sufficient for manufacturing the required product(s) 110, then the effluent may be disposed-off in step 318 as non-hazardous, and/or non-regulated waste stream.

If the effluent 240 recovered at step 308 cannot be disposed of due to the fact that is hazardous, or if additional quantities of recovered materials are required for manufacturing larger and/or multiple products 110, the recovered effluent 240 is processed further. The effluent 240 as a whole may contain a precipitated solid portion and/or suspended solids portion 210, and a liquid effluent portion 220. The effluent 240 is subjected to method step 310 that may comprise one of filtration, evaporation, decantation, separation including centrifugal, and gravity, ion exchange, precipitation, co-precipitation, freeze-drying or any combination thereof. As a result the solid effluent 210 is recovered in step 310, along with the liquid effluent 220. The solid effluent 210 may be further processed including drying, and grinding, prior to being used optionally as a part of the plurality of recovered materials 104. In case additional solids are required, or for any other reason such as decontamination and disposal, the liquid effluent 220 is optionally processed further in step 314 to recover solids 212, before being discharged in step 318. A processed liquid effluent 222 recovered in step 314 is a relatively clear solution, and may be optionally fully or partially recycled back into the process. However, if additional solids are required to be included in the plurality of recovered materials 104, or toxicity is associated with dissolved solids or residual suspended solids present in the processed liquid effluent 222, then in order to recover the dissolved and optionally suspended solids from the processed liquid effluent 222, the processed liquid effluent 222 may be subjected to step 316 which may involve a plurality of further processing steps such as filtration, condensation, evaporation, freeze drying, thermal drying, absorption, ion exchange, precipitation, co-precipitation, or any combination thereof. As mentioned above, step 316 is to be performed optionally to recoup at least all or a portion of any suspended solids and the dissolved solids from the processed liquid effluent 222, forming a recovered solid portion of the processed liquid effluent 226, and a recovered liquid portion of the processed liquid effluent 224. In case contaminants are associated with either suspended and/or dissolved solids, upon capturing and recouping the solids 226, the recovered liquid portion of the processed liquid effluent 224 can be safely disposed off without presenting any challenge to the environment, and without the need for any additional treatment. Alternatively, the recovered liquid portion of the processed liquid effluent 224 in step 316 instead of being discharged in step 318, may be integrated (not shown in FIG. 3), as a whole or in portions, into the plurality of recovered materials 104, if for example wet mixing is envisioned as a part of creating the pre-processed product in step 106 of the method 100. The solids 226 recouped in step 314 may be the result of complete evaporation of the processed liquid effluent 222. As mentioned earlier, the recovered solid portion of the processed liquid effluent 226, if any, and if not toxic, may optionally be added to the plurality of recovered materials 104. If the recovered solid portion is toxic, then it is disposed of as a hazardous substance, according to the procedures dictated by the local laws.

If the recovered liquid portion of the processed liquid effluent 224 could not be recycled back into the process, or could not be discharged, because the level of contaminants comprised in the recovered liquid portion of the processed liquid effluent 224 is above the permissible discharge level established by the local laws and applicable permits, then it is treated as waste and is handled accordingly. Further decontamination steps may be performed to the liquid portion of the processed liquid effluent 224 to bring the levels of contaminants below the discharge limits, including, ion exchange, precipitation, co-precipitation, absorption, solidification, evaporation or a combination thereof. Any other process that will render safe disposal of the recovered liquid portion of the processed liquid effluent 224, and the recovered solid portion of the processed liquid effluent 226 is considered to be included within the scope of the present invention. Appropriate waste management procedures may also apply to the recovered solids from both the effluent 240 and the gaseous effluent 230 in the event that they are toxic and are regulated. It is also within the scope of the present invention that the plurality of either one of the steps 308, 312, 314, and 316 be combined into one, depending on the type of biomass, type of fluid, and the nature of the interaction of the biomass 202 with the fluid 204 in step 102. As an example, if the biomass is hair, and the fluid is an aqueous solution of hydroxide, the resulting effluent 240 is primarily a clear liquid, and steps 308, 312, 314, and 316 are combined into one. In this case solids 212 are recovered from the liquid effluent by precipitation and/or evaporation.

The processing steps described above in connection with the materials 104 recovered from the interaction between the biomass 202 and the at least one fluid 204 may be repeated as many times as necessary to obtain the desired quality and quantity of the recovered materials 104. The quantity of the recovered materials 104 required to form the desired product 110 according to the present invention may vary from a few milligrams to several kilograms.

The plurality of recovered materials 104 resulting from the interaction between the biomass 202 and at least one fluid 204, irrespective whether the fluid 204 is a liquid or a gas, comprises a plurality of solid materials, comprising at least one of the primary solid material 206, the plurality of solid effluent 210 recoverable from the effluent 240 resulting from the interaction between the biomass 202 and the at least one fluid 204, the plurality of solids 212 recovered from the liquid effluent 220 recoverable from the effluent 240 resulting from the interaction between the biomass 202 and the at least one fluid 204, and the plurality of solids 208 recovered from a gaseous effluent 230 resulting from the interaction between the biomass 202 and the at least one fluid 204. The resulting solids 206, 208, 210, and 212, and 226 may be combined or processed separately. Once a sufficient quantity of recovered materials 104 has been collected from the interaction between the biomass 202 and the at least one fluid 204, said recovered materials may be subjected to further processing steps prior to step 106 of combining the plurality of recovered materials 104 with the at least one precursor material 116, 118, 120, and 122 to create a pre-processed product 124. Exemplarily said steps may be drying, heating, pulverizing, grinding, particle size classification, or any step that will give the recovered materials 104 a desired quantity, particle size, particle size distribution, physical form and that allows the plurality of recovered materials 104 to be suitable to be combined successfully with at least one or with all of the plurality of precursor materials 116, 118, 120 and 122.

As mentioned above in connection with the method illustrated in FIGS. 1 and 3 the interaction step 102 between the biomass 202 and at the least one fluid 204 is one of a chemical interaction, a physical interaction, a high temperature reaction, a high temperature decomposition, a wet oxidation reaction, a dissociation reaction, a dissolution action, a dissolving action, a freeze drying action, a rinsing action, a soaking action, a spraying action, a washing action, a dedusting action, a cleaning action, a drying action, a physical removal action, a size reducing action, a separating action, an interaction with gases and vapors, an interaction with steam, a combustive interaction, and a combination thereof.

Such interactions may be carried out for example under various atmospheric, sub-atmospheric, and pressurized conditions, interaction with a mixture of fluids such as air, gases and liquids, interaction with steam, interactions under combustive and flame conditions, interaction under supercritical conditions, interaction under hydrothermal conditions with a plurality of alkaline solutions, interaction under hydrothermal oxidizing conditions with a plurality of alkaline solutions, and interaction using an alkaline hydrolysis method.

Referring back to FIG. 2, the biomass 202 subject to the interaction comprises at least one of human or animal derived tissue, a plurality of human or animal derived matters, a human cadaver, human remains, a plurality of bone fragments, a plurality of materials of human origin, an animal carcass, cremation ash, cremation remains, articles and parts belonging and/or originating from a deceased or living individual or animal, parts of human or animal origin, wherein said human, or said animal are alive at a time of collecting of said plurality of parts, parts of human or animal origin, wherein said human, or said animal that are to be in-ground buried, and a combination thereof. The at least one fluid 204 that is brought into interaction with the biomass 202 may be at least one of an alkaline solution, water, steam, an acidic solution, a plurality of organic solvents, reactive gases, a plurality of organic acids, a plurality of organic liquids, liquid oxidizers such as hydrogen peroxide, carbonates, bicarbonates, water soluble inorganic salts, soaps, or a combination thereof. Exemplary embodiments of the alkaline solution are at least one of an aqueous solution comprising potassium hydroxide, barium hydroxide, cesium hydroxide, sodium hydroxide, strontium hydroxide, calcium hydroxide, lithium hydroxide, ammonium hydroxide, sodium carbonate, potassium carbonate and a combination thereof.

Referring again to the illustration of FIG. 1, the step of combining the plurality of recovered materials 104 with the at least one precursor material 116, 118, 120, 122 in step 106 to create a pre-processed product 124, followed by step 108 of processing the created pre-processed product 124, will be described in detail for each category of exemplary products 110 that fall within the scope of the present invention, in subsequent sections of this specification. Specifically exemplary embodiments of steps 106 and 108 will be described in detail at least in connection with the embodiments of the invention that refer to glass, ceramics, metal, and cementations products.

As described above at least in connection with the embodiment of the invention shown in FIG. 3 the plurality of recovered materials 104 may comprise substantially organic materials. Further, the plurality of recovered materials 104 may be substantially inorganic, or may be a combination of the two, and may contain as well carbonaceous and hydrated materials. The organic materials present in the plurality of recovered materials 104 may or may not interfere with the creation of the pre-processed product 124 in step 106, and with the processing step 108 that leads to the formation of the at least one product 110 according to the present invention. Exemplarily the presence of organics in the plurality of recovered materials 104 negatively influences the creation of a glass pre-processed product in step 106. Alternatively, the presence of organics in the plurality of recovered materials 104 does not have a negative impact upon the creation of pre-processed products that comprise cements, polymers, clays, and paints. In general, when combining step 106 and processing step 108 do not involve high temperature processing above which thermal decomposition of the organics occur, and/or environments that induce dissociation and decomposition of the organics, the presence of the organics in the plurality of recovered materials can be tolerated. The above generalization holds only when the pre-processed product 124, and product 110 may be sensitive to gas formation because of the decomposition and dissociation of organic and carbonaceous species during the steps of 106, and 108.

If the step 106 and 108 of processing the pre-processed product 124 to form the solid product requires that the plurality of recovered materials 104 to be substantially free of organics and/or carbonaceous materials, the plurality of recovered materials 104 may be subjected to further processing steps, steps that are not illustrated in FIG. 1. For example, the plurality of recovered materials 104 may be heated in an air or pure oxygen atmosphere to oxidize or gasify the organics present into gaseous phases that would be exhausted leaving behind essentially organic free solid materials. This process is considered to be a gaseous interaction with the biomass. In this case the plurality of recovered materials 104 containing organics and/or carbonaceous materials are analogous to the biomass 202, the and air or oxygen atmosphere used for oxidation are considered at least a fluid 204. Heating to higher temperatures is considered a part of interaction between the fluid and biomass, and as described before is a physical interaction. Heating accelerates the removal process of organics, and provides a shorter residence time. Chemical means can also be employed to remove residual organic materials, such as treatment with solvents, steam, water, and solutions of acids, and bases, and alike. In case liquid chemicals are to be used, then the process is considered to be a chemical interaction. If only dissolving is involved in removing the organics, then the interaction may be considered a physical removal process rather than a chemical removing process. In case other physical methods are to be used to remove the organics that are not desirable from the plurality of recovered materials 104 such as such as shaving, grinding, chipping, or alike, then again the interaction is considered to be a mechanical/physical interaction.

In other embodiments of the present invention where in contrast with the above, the organics form the entire or a majority portion of the plurality of recovered solid materials 104, the pre-processed product 124, and the product 110 are adapted to accept the organics without the need of removal of the organics and/or carbonaceous materials from recovered materials 104. The final product 110 includes a portion of the organics that were included in the plurality of recovered materials 104. Therefore, the plurality of recovered materials 104 according to the present invention may comprise both organic and inorganic portions, or a combination thereof. Within the same context of organics inclusion or exclusion described above, certain other species that are not organics, and mostly comprise of inorganic matters may be dealt with similarly by chemical and/or physical interactions.

In the particular case when the biomass 202 is constituted by a human cadaver, cremation remains, or an animal carcass, the plurality of recovered materials 104 is primarily composed of bone fragments that are rich in oxides of calcium and phosphors forming calcium phosphates, including the mineral apatite $Ca_5(OH, F)(PO_4)_3$.

The product 110 manufactured via the methods described in this document in connection with FIGS. 1 to 4 is one of a shaped article, an art form, an ornamental form, a functional article capable of being used to perform a function, a non-functional article, a multifunctional article, a jewelry, a block, an abstractive article, a decorative article, an article capable of providing aesthetics and a combination thereof.

All the above embodiments for product 110 share the characteristic that they are a solid product and may be presented as one or multiple solid products, solid objects, solid forms, and/or solid final forms. In the remaining portions of this document all of the above terminology is used interchangeably, to designate a solid product or products, or a product comprising various solid components.

By a "functional article" is understood an article that can be used to perform a function, such as exemplarily a cup is used for drinking, a light fixture is used for lighting, etc. By a "non-functional article" is understood an abstract article that even though may not serve a particular functional purpose, provides aesthetics properties such as being decorative and pleasing to the eye. A multifunctional article is capable of performing more than one function, such as a glass vase which has fluorescence properties. Such a multifunctional vase, can be used to hold flowers, while being able to glow in dark.

As described above the solid product(s) 110 of the present invention are made by incorporating into their makeup a plurality of recovered materials 104, obtained either directly or indirectly after an interaction has taken place between biomass 202 and at least one fluid 204. The amount of recovered materials 104 needed to manufacture the desired solid product or products depends on the size, type, and number of desired solid products 110. The amount of recovered material 104 ranges between a few milligrams to several kilograms or may be constituted by the entire quantity of solids recovered from the interaction 102.

Although the present invention envisions that a large variety of products 110 objects fall under its scope, in the following emphasis will be placed upon describing the solid products 110 that comprise at least one solid forming material, a composite forming material, a plurality of articles or at least a combination thereof. The at least one composite forming material comprises one of a paint forming composite, a clay forming composite, a cement forming composite, a wood forming composite, a polymer forming composite, a nano forming composite, a metal forming composite, a fabric forming composite, an organic polymer forming composite, an inorganic material forming composite, a stone forming composite, a rock forming composite, a paper forming composite, a plurality of ink forming composites, a combustible material forming composite, a diamond forming composite, a reinforced fiber forming composite, a powder-binder forming composite, a polymer forming composite for filling 3D printer cartridges, and a combination thereof. The at least one solid forming material comprises at least one of a glass forming material, a ceramic forming material, a glass-ceramic forming material, a crystal forming material, an organic forming material and a combination thereof. The plurality of articles comprises at least one of a template, a substrate, a block, a painted article, a painting, a polymeric article, a polymer composite article, a glass article, a ceramic article, a glass ceramic article, a clay article, a cementiteous article, a metallic article, and a combination thereof.

In accordance with an embodiment of the present invention, the solid product 110 is at least one of an art form, an ornamental form, a jewelry, a functional article, a block, a non-functional article and a combination thereof. Detailed explanation regarding the other media may be found in connection with embodiments of the present invention described in the following portions of this document.

In a particular embodiment of the present invention the biomass 202 is a plurality of material of human origin, such as hair or nail tissue. Exemplarily, in accordance with one embodiment of the present invention, the hair is chemically interacted with an acid, such as nitric acid in a step 102, to isolate the cysteine, as the plurality of recovered product 104. In one example hair cysteine is extracted from a protein (i.e. Keratin) in human hair. According to the present invention the extracted cysteine can be combined at step 106 into an appropriate matrix, such as paint, clay, cementiteous matrix and polymer matrix in order to form either the pre-processed product 124 or the final product 110.

In accordance with one embodiment of the present invention about 20 grams of human hair, as biomass 202 was interacted with about 400 milliliters of a solution of Instant Power® Hair Clog Remover (Scotch Corporation) as the at least one fluid 204. The solution is a concentrated aqueous solution of about 34%-50% sodium hydroxide. After hair was substantially dissolved, about 50 milliliter effluent was extracted, and dried in a drying oven initially at about 60° C., followed by a final soak at 120° C. for several hours. A portion of the solids so created were combined in step 106 with a commercial grade refined linseed oil forming a paste with relatively thick consistency. The resulting paste was further combined with an oil based paint (Winton titanium white oil paint by: Winsor-Newton), forming an of white color oil paint product 110. The paint product 110 was further used in painting a portrait of a person from whom the hair sample had been originally obtained. In this case the paint is the created pre-processed product 124, and the painting is the product 110. In the example discussed above it is envisioned in accordance with the present invention that the hair, that is biomass comprising a plurality of parts of human origin, may have been collected at a time that the human it originated from was alive. Alternatively, the biomass comprising a plurality of hairs of human origin may originate from a deceased individual, wherein the deceased human is to be buried in-ground. The above example is as well envisioned to apply to a portrait of pet painted with paint manufactured as above using hair collected from a live or deceased pet.

In accordance with another embodiment of the present invention, hair 202 was interacted with a fluid 204, in this case air and heated to first dry the hair in the step 102. The interaction was continued at higher temperatures which converted the hair into ashes, forming therefore the primary solid material 206. Since no other solids were recovered in the process, the plurality of recovered materials 104, only comprises in this embodiment of the invention the ashes 206. The yield of hair to ashes was about 2 wt %. Hair ashes normally contain various elements such as calcium, copper, sodium, potassium, iron, magnesium, manganese, phosphorus, oxygen, carbon, nitrogen, chlorine, and sulfur, and others. The resulting ashes were combined with linseed oil, and then combined with an oil based paint like previously described above forming the pre-processed product 124. The resulting paint was used to create a painting 110 in step 108.

Nail tissue is made of translucent keratin protein made of amino acids. Both calcium and magnesium are present in the nail. In accordance with one embodiment of the invention, biomass 202 comprising of clippings of fingernails and toenails was interacted with a fluid 204 comprising an aqueous solution of nitric acid, forming an effluent 104. In this case no primarily solid material 206 was generated, nor a solid effluent 210, since biomass 202 is completely dissolved. The resulting liquid effluent 220 was first neutralized with lime water, and then was allowed to dry in a shallow dish at ambient temperature for several days. The resulting solid from liquid effluent 212 formed the entire plurality of recovered materials 104. Similar to the examples presented above, the plurality of recovered materials 104 were combined with paint, and a painting was created.

In another embodiment of the present invention, nail tissue 202 comprising nail clippings, may be interacted with air as a fluid 204 under heating conditions to create an ash as a primary solid material 206, which in turn forms the entire plurality of recovered materials 104. The plurality of recovered 104 may be combined with any precursors in accordance with the method 100 of the present invention to form a product 110.

The provenance of the hair or nail tissue discussed in connection with the embodiments of the invention described above is either a living individual, an deceased individual who's preferred method of disposition is interment or an individual who's body is disposed of by any other disposition method available.

In the following, several further embodiments of the present invention are described, both insofar their specific method of fabrication and regarding the generated product 110.

In accordance with one embodiment of the present invention the product 110 is a glass product.

The glass product 110 created in accordance with methods 100, 200 or 300 of the present invention and described in connection with one embodiment of the present invention comprises a plurality of recovered materials 104. The plurality of recovered materials 104 is preferably substantially free of residual organics and carbonaceous materials. Organic and carbonaceous materials when subjected to the elevated temperatures in a glass melt oxidize and/or decompose and form volatilized species. When volatilized species cannot escape because of the viscosity of molten glass, they become entrapped, and as a result may form gas bubbles in the glass. Unless the glass is refined from entrapped gas bubbles, the gas bubbles stay behind in the glass when cooled to room temperature. This may weaken the glass, among other potential disadvantages. However, it must be understood that in some cases, having organics and/or carbonaceous materials may not negatively interfere with the quality of the made glass to such extent that it may require that the recovered materials 104 to be substantially free of residual organics and carbonaceous materials. It also must be understood that sometime gas bubbles may be desirous to some individuals, which in that case having gas bubbles is sought.

Figure 4:
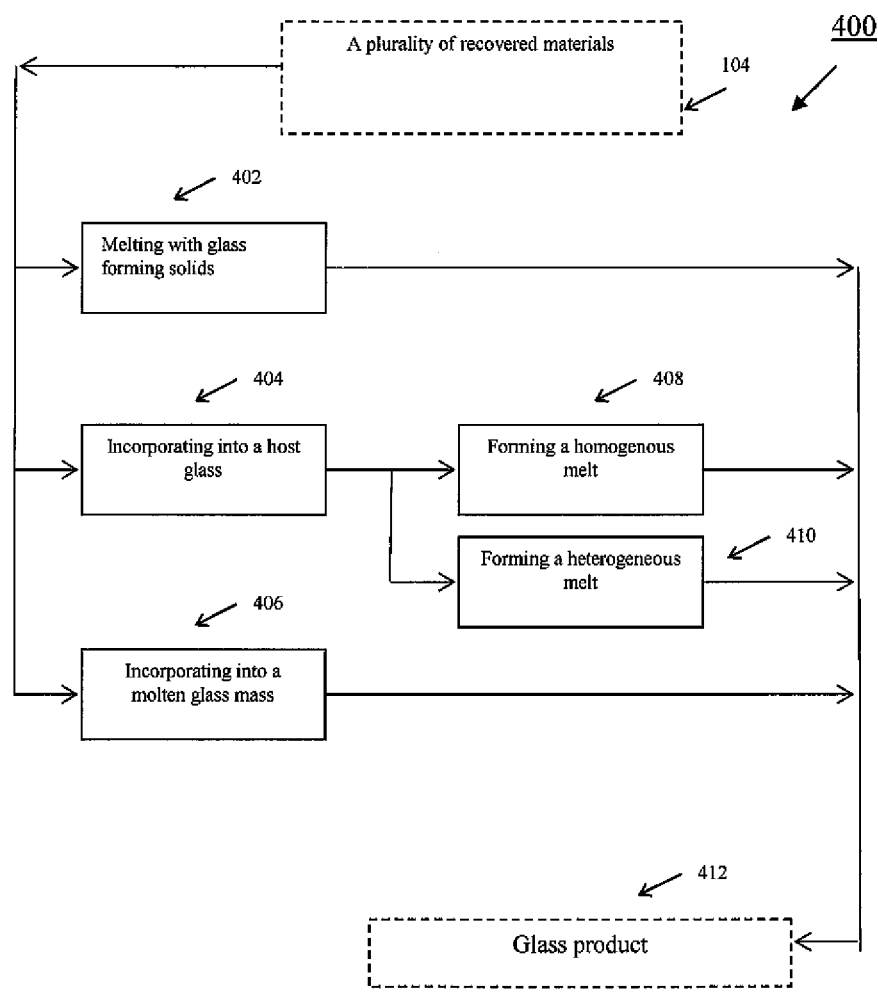
FIG. 4 is a block diagram showing yet another embodiment of the methods for forming an exemplary product, wherein the product is a glass product.

Referring now to FIG. 4, FIG. 4 is a block diagram showing yet another embodiment of the methods for forming a product, wherein the product is a glass product.

According to one embodiment of the present invention, a mixture of glass forming solids as a precursor 118 and the plurality of recovered materials 104 is realized by incorporating the plurality of recovered materials 104 into a glass formed with the glass forming solids 118. The realized mixture is melted in step 402 to form a substantially homogenous glass. The glass forming solids 118 according to the present invention include at least one of a glass former from the group of silica, boron oxide, germania (germanium oxide), phosphate, alumina, and a combination thereof. Other glass forming components are intermediate oxides, and oxide modifiers. The intermediate oxides comprise alumina (aluminum oxide), lead oxide, iron oxide, titanium oxide, rare-earth metal oxides, and others. The oxide modifiers include alkali/alkaline earth metal oxides. Colorants and special effect oxides can be selected from a variety of oxides known for their effects in the glass. More details about various special effect components in the glass may be provided in the following sections of this document.

In another embodiment of the present invention, the recovered materials 104 can be incorporated in a host glass melt in step 404, either in a homogenous manner 408, or in a heterogeneous manner 410.

Yet in another embodiment of the present invention, the plurality of recovered materials 104 form a distinct region of a glass article 412. This may be obtained by applying the plurality of recovered materials 104 over a surface or inside of a molten mass (glob) of glass, in step 406. In this case the regions where the recovered materials are located in the glass article 412 may be designed to be visually differentiable from the rest regions of the glass article.

In the case of homogenous and heterogeneous incorporation (steps 408 and 410) into a glass melt, the recovered materials 104 substantially dissolve in the host glass when homogenously incorporated, whereas in the case of heterogeneous incorporation, the glass article where the recovered materials 104 are present remains distinguishable from rest of the host glass.

It is also possible to have situations whereby a combination is realized and the incorporation of the recovered materials 104 in a host glass takes place both partially heterogeneously and partially homogenously. It must be understood that the embodiment 400 in FIG. 4 is adaptable/consistent to/with the general embodiment 100 in FIG. 1. The combining step 106 of the embodiment 100 is analogous to the step of mixing the recovered materials 104 either with the solid forming precursor 118, or with solid precursor 122 (glass melt in this case), steps which are not shown in FIG. 4. The processing step 108 of FIG. 1 is analogous to either individually or to a combination of steps 402-410 of FIG. 4. Glass product 412 is analogous to product 110 of FIG. 1.

The solid precursor 122, in the case of a glass product may be called a host glass according to embodiments of the present invention. The host glass 122 employed according to the above referenced embodiments of the present invention include all oxide and non-oxide glasses. Examples of oxide glasses are silicates, borates, phosphates, germinates, and other oxide glass systems. Examples of non-oxide glasses are fluorides, and chalcogenide glasses. The preferred host glasses according to the present invention are silicates, borates, and phosphate glasses. Within the category representing the silicate glasses, commercially available silicate glasses are soda lime silicates, borosilicates, and aluminosilicates, which further can comprise various alkaline/alkaline earth metal oxides, lead and tin oxides, rare earth metal oxides, transition metal oxides, and other oxides that are compatible with a respective glass system are within the scope of the present invention. Within the category representing borate glasses, alkaline borates, alkaline earth borates, and other metal oxide borates may be used as host glass or in combination with a silicate or phosphate glass. Within the category representing phosphate glasses, alkaline, and alkaline metal oxide phosphates in combination with other oxides may be used as host, alone, or in combination of a silicate or borate host glass.

The host glass 122 according to the present invention may be pre-melted glass materials, called glass cullet or frit.

Other oxides can also be added to a host glass 122, in addition to the plurality of recovered materials 104 to achieve a targeted final glass composition. For example, if the source of the plurality of recovered materials 104 comprises primarily bone fragments, then oxides are introduced into the host glass via the addition of the recovered materials, that comprise calcium oxides, and phosphorus oxides (as calcium phosphate), among other minor constituents of bone. If the host glass is a typical soda lime glass (i.e. window type glass) or a borosilicate glass (i.e. Pyrex™ by Corning Corp.), then optionally one of aluminum oxide, zinc oxide, color producing oxides such as the transition metals including iron oxide and copper oxide, rare earth oxides of other commonly known oxides may also be added to impart color or special optical effects to the resulting glass product, or glass-ceramic product.

In order to form a homogenous glass product 412 by combining the plurality of recovered materials 104 and a host glass 122 as the precursor, the amount of the plurality of recovered materials 104 should not exceed the solubility limits of species present in the recovered materials 104, in the host glass 122. This means that if the solubility limit is exceeded for a certain species, then a portion of that particular species remains undissolved in the host glass 122. Since dissolution rate of a species is temperature and time dependent, a sufficient length of time should be allowed to dissolve the entire quantity of the species in the recovered materials 104 in the host glass 122 at that given melt temperature. If the concentration of a species in the recovered materials 104 exceeds the solubility limit in the host glass 122, the portion of the species that is not dissolved forms a non-transparent phase in the glass product 110. In some cases having an undissolved portion of the recovered materials may provide an optical identifier of the recovered materials 104 in the host glass 122 which might be desirable in the final glass product 110.

In a glass-ceramic product, discrete crystalline phases coexist with a glassy phase. Glass-ceramic materials according to the present invention have a glassy phase (an amorphous phase) and one or more crystalline phases that are produced by either "controlled crystallization" or by the incomplete dissolution of the recovered materials 104 in the glass, which is termed heterogeneous or partially heterogeneous depending on concentration and dispersion of crystalline phases. The glassy phase may be originated from solid forming precursor 118, or optionally a host glass 122. For the sake of simplicity, in the next part of the description, glass formed via combination of the recovered materials 104 with a solid forming precursor 118, or optionally formed via combination with a host glass 122 are treated as interchangeable. A more detail description regarding creating a glass ceramic product is provided in the following portions of this document.

In another embodiment of the present invention, special additives are optionally added to a glass melt containing the recovered materials 104, in a controlled manner to provide special properties to the resulting glass, or glass ceramic. These effects include high strength and toughness, excellent chemical durability, controlled color and translucency or opacity, phosphorescent, fluorescence, machinability, ferromagnetism, biocompatibility, and bio-activity. These properties can be tailored by adjusting the host glass composition via introduction of special additives and/or by controlled heat treatment/crystallization in steps 106, and 108. In one example, the resulting phosphorescent glass or glass ceramic of the present invention can glow-in-the-dark. One way to form a phosphorescent glass ceramic is by doping an appropriate aluminosilicate glass containing the recovered materials 104, with rare earth oxides, such as for example terbium oxide. The biocompatibility of the plurality of recovered materials 104 and that of glass is natural since the recovered materials contain calcium phosphate which enhances the biocompatibility of the resulting glass or glass ceramics. It is also possible to include metallic particulates into the glass melt forming metallic suspensions. Exemplarily the metals particulates are fine powders of precious metals such as gold, silver, and platinum. It must be understood that the special additives can also be added to the glass during the glass forming method, whereby the glass is formed by melting the recovered materials with glass forming materials.

In accordance with another embodiment of the method of the present invention, a glass-ceramics product 110 may also be produced. First, a glass pre-processed product 124 is formed in step 106 by mixing and melting the recovered material with an appropriate host glass 122. Further, the so created pre-processed glass product is cooled down and is subsequently reheated in step 108. During this heat treatment the glass partly crystallizes. A nucleation aid such as titanium oxide can be added to the host glass of the glass-ceramic to control nucleation and control the crystallization process in step 108. Examples of appropriate silicate host glasses are alkali aluminosilicates, alkaline earth aluminosilicates, and zinc oxide aluminosilicate glasses. All these glasses, with the addition of the recovered materials, which are primarily made of calcium phosphate, are capable to form a glass-ceramic product 110.

According to the present invention the glass and glass ceramics products are annealed in step 108 at lower temperatures. By annealing in this context is understood controlled cooling from higher temperatures to lower temperatures in order to remove thermally induced stresses. The preferred higher temperature is a temperature at or above the annealing temperature (also called annealing point) for that particular glass composition. The glass is then allowed to equilibrate temperature wise throughout before slowly cooling at a pre-determined rate until its temperature is below the strain point of that particular glass composition. Following, the temperature is dropped to room temperature at a rate limited only by the natural rate of cooling of the annealing oven or in some cases, by the rate of cooling caused by the air cooled outside the annealing oven. The annealed glass product 110 can be subjected safely to secondary operations such as cutting, drilling, grinding, polishing, etc. In the case of glass ceramics, the annealing is performed for the glass phase. According to the above, the processing step 108, may comprise of several sub-steps, in this case heating, heat treatment, annealing, and secondary operations. The same applies to the combination step 106, which again may comprise several sub-steps to create a pre-processed product.

In accordance with an embodiment of the present invention a combination is envisioned between a glass solid forming precursor 118, comprising of appropriate amounts of glass forming oxides, intermediate oxides, and modifier oxides, and the plurality of recovered materials 104. Glass forming oxides compounds are at least one of silica, and boron oxide, intermediate oxides, that are at least one of phosphorous oxide, aluminum oxide, titanium oxide, tin oxide, lead oxide, zinc oxide, and modifier oxides that comprise at least one of a sodium oxide, potassium oxide, lithium oxide, calcium oxide, barium oxide, magnesium oxide, and strontium oxide. The recovered materials 104 are combined with the solid forming precursor 118, charged into a high alumina refractory crucible, followed by melting the combination inside a high temperature furnace, all in step 106. Melting in step 106 is carried out above the melting temperature of the targeted glass composition from which product 110 is formed. Upon a sufficient length of time in the furnace, a glass melt which represents the pre-processed product 124, is formed. All other colorants, and desired dopants can be added as described above in connection with the previous embodiment. For example, aluminum oxide may be combined with phosphorous oxide to form a stable phosphate glass backbone structure as $Al(PO_3)_3$ in combination with the other oxides present. Therefore, the addition of aluminum oxide as an intermediate oxide to a bone derived recovered material promotes a stable glass formulation for example in a silicate glass. In step 108, the molten pre-processed product 124 is poured out from the crucible into a rectangular shape mold made of cast iron, followed by transferring the into an annealing furnace at a temperature slightly above the annealing temperature of the resulting glass. Upon equilibrating the temperature of the glass and the annealing furnace, the glass is annealed to room temperature. The molded glass is then cut into four sections with a water cooled diamond blade saw, and polished on the sides and edges using a stationary disc sander to complete the process and arrive at the final product 110.

In the embodiments of the present invention, especially in the embodiments where the resulting product 110 is made of glass, coloring materials and functional dopants such as those that can impart translucency, opacity, phosphorescent, fluorescence, porosity, ferromagnetism, biocompatibility, and bio-activity, can be added to the glass. Further, a mixture of the glass forming compounds, either as oxides, metals, colored glass, or alike may be as well added to impart various colors and properties to the final glassy product 110. To lower the viscosity of the glass, fluxes may also be added. For instance copper oxide can be added to impart a ruby color to the product, cobalt oxide for cobalt blue, manganese oxide for a pink color, silver or gold particles for various shades of silver and gold, and others.

In the processing step 106, the created glass pre-processed product 124 is melted in an appropriate clay, ceramic, or metal crucible in an electric or gas-fired kiln/furnace that can achieve the melting requirements. In the case of using a host glass 122, the host glass 122 can be melted first and then the plurality of recovered materials 104 and other optional ingredients such as oxides, coloring dopants, glass ceramic nucleating agents, are added to the melt. Melting is continued to reach the targeted homogeneity. In step 108, the glass is poured/removed from the melting crucible, formed into a desired shape, cooled by annealing as described above, and optionally post processed (i.e. machined) as needed to provide the targeted final product 110.

In accordance with the present invention, in step 108, the created glass pre-processed product 124 can be in the form of a cast block, blown either by free blowing or mold blowing, pulled into fibers, or shaped by any available techniques into a desired form. The temperature range to work/shape the glass varies depending on a particular glass composition used. For example this temperature range for a commercial soda lime glass (window glass) is approximately from 700-1000° C., and for a commercial borosilicate (Pyrex), is about 820-1245° C. In a glass blowing operation, the glass product according to the present invention may be used in combination of the glass pool of the glass blower which is maintained in a molten state in a crucible or furnace. Care needs to be taken to match or near match the expansion coefficient of glasses being mixed together to avoid thermal stress cracking upon cooling to room temperature. As pointed out above, annealing can remove the majority of the thermal stresses. In another embodiment, glass in the glass blower's glass pool is considered to be the host glass 122, and the plurality of recovered materials 104 is combined with a gob of the glass from the glass blower's glass pool in step 106 to create the pre-product 124, optionally before and/or after the gob is shaped into a form by the glass blower. Upon completion and forming a glass article in step 108, the glass article is annealed and if necessary additional post-processing sub steps performed while still in step 108. The finished glass article forms the product 110.

Therefore, in accordance with one embodiment of the present invention, the plurality of recovered materials 104 are combined in step 106 with either a plurality of solid forming precursor materials 118, and/or combined with a plurality of solid precursor materials 122, to form the pre-processed glass product 124 in step 106, followed by the additional steps of shaping, annealing, and post processing in step 108, leading to the product 110. Solid precursor 122 or equally host glass 122, in a molten state may comprise oxide and non-oxide glasses. The oxide glasses may be one of oxide glasses, such as silicates, borates, phosphates, aluminates, germinates, and other oxide glass forming systems. The non-oxide glasses may be fluorides, and chalcogenide glasses.

Other functional and multi-functional additives may also be added into the mixture of the plurality of recovered materials 104, and glass forming precursor materials and/or host glass 122 at different stages of combining and melting in step 106, and shaping in step 108. These functional and multifunctional additives are capable of imparting unique properties to the final product 110. Examples of such additives are rare earth oxides that can provide florescence, and luminescence properties to the glass product 110, in addition to inducing unique colors.

As discussed above, the plurality of solids forming materials 118 comprises as well a combination of at least one of glass forming precursor materials, and ceramic forming precursor materials. Specifically, a silicate based glass forming material may be a soda lime or a borosilicate base glass, and the ceramic forming portion are crystallite nucleating oxides such as titanium oxide, and phosphorus oxides that are capable to form crystalline phases in a silicate based glass. As a result it is expected to form glass-ceramics naturally by the addition of recovered materials 104 comprising bone materials which is primarily a calcium phosphate compound to a host silicate glass.

In accordance with another embodiment of the present invention, a host molten glass 122 can be used to encapsulate and/or incorporate the plurality of recovered materials 104, internally, and/or externally. The recovered materials 104 are worked into a gob of host molten or soften glass 122 in step 106, being either encapsulated within the interior and/or incorporated onto the surface of the gob. The gob is then shaped and formed into a final desired shape and cooled in step 108. This embodiment is distinct from the embodiment mentioned above that describes the heterogeneous incorporation of the recovered material 104 in the host glass melt 122. In said example the recovered materials 104 are only partially dissolved. In contrast, in the case of encapsulation and incorporation of the present embodiment, the recovered materials 104 are either sealed within the interior and/or incorporated within the exterior of the host glass 122 without being substantially dissolved. This also applies when the glass blower utilizes the recovered materials 104 into a blown glass product 110.

In accordance with the embodiment of the invention described above, it is preferable that the plurality of recovered materials 104 is dispersed well enough inside the host glass melt 122 so that that the thermal stresses are minimized. If the recovered material 104 degasses when brought into intimate contact with the host glass melt 122 in step 106, it is advantageous for the size of gas bubbles to be small enough to prevent cracking and fracture of the resulting glass product 110 upon cooling to room temperature.

Glass coloring materials, and functional dopants, such those that induce texture, translucency or opacity, phosphorescent, fluorescence, machinability, ferromagnetism, biocompatibility, and bio-activity, can be added to the host glass 122, or to the solid forming precursor 118, prior, during, or after combining the plurality of recovered materials 104 in step 106, to impart various colors and properties to the final glass product 110. In addition, to lower the viscosity of the glass, fluxes can be added to the glass or to the recovered materials 104.

The glass and the glass ceramic disclosed above in connection with step 108 can be poured into plates and sheets, casted into various forms, blown either by free blowing or mold blowing, pulled or blown into fibers, or shaped by various techniques into a desired form. As a result the product 110 comprising at least one of a glass, and glass-ceramic may be at least one of a shaped article, a stained glass, a sheet, a plate, an art form, an ornamental form, a functional article capable of being used to perform a function, a nonfunctional article, a multifunctional article, a jewelry, a block, an abstractive article, a decorative article, an article capable of providing aesthetics and a combination thereof. In addition, the glass product 110 according to the present invention can be made to exhibit special effects such as being magnetic, pressure sensitive, light sensitive, phosphorescent, fluorescence, luminescent, bioactive, and many other forms.

In accordance with another embodiment of the present invention, the resulting product 110 may incorporate a solid material comprising a smart glass that changes optical properties as it responds to a voltage and heat passing through it, such as an electrochromic glass. These glasses in turn can be incorporated into electrochromic devices.

In accordance with another embodiment of the present invention, the product 110 comprises at least one other solid material, the solid material exemplarily being a ceramic material, a metal, and a composite. The plurality of solids forming materials envisioned in accordance with this embodiment of the invention and used to create a ceramic product 110, comprises at least a ceramic forming precursor material(s), and a ceramic article, or a combination of ceramic forming precursor materials and at least other materials that are solid.

The products comprising at least one ceramic phase in accordance with the embodiment of the invention are one of a shaped article, an art form, an ornamental form, a functional article capable of being used to perform a function, a nonfunctional article, a multifunctional article, a jewelry, a block, an abstractive article, a decorative article, an article capable of providing aesthetics and a combination thereof.

Exemplarily the ceramic solid forming precursor materials 118 comprised by the ceramic products 110 in accordance with the present invention are based on one of aluminosilicates, kaolinite, mullite, cordierite, bone china, porcelain, aluminates, zirconates, titanates, phosphates, or a combination thereof. The ceramic solid forming precursors 118 are presented as one of a paste, powders, gels, slurry and a combination thereof.

In addition, many glass-ceramic compositions can be formulated which contain both amorphous glass and crystalline phases. The major criteria for selecting which ceramic solid forming precursor 118 should be employed is dependent on multiple factors including the ease of processing, durability, dimensional stability, and cost. The alumina silicate based ceramic forming solids are the preferred precursor to be used in connection with the ceramic products of the present invention as they are readily available in different forms and compositions; however, other ceramic forming solid precursors may as well be chosen depending on desired properties for product 110.

In accordance with an embodiment of the present invention, a kaolinite based ceramic solid forming precursor 118 is combined with the plurality of recovered materials 104 obtained from the method 200 in a blender, in step 106 resulting in a powder blend material. The powder blend material is further combined with a ceramic binder, such as polyvinyl alcohol, and then pressed in a die to form a cylinder, creating a pre-processed product 124. Any other shapes are possible by using a corresponding die. Complex shapes may also be attained by hot or cold isostatic pressing in step 106. Other forming techniques are also within the scope of the present invention. In step 108, the pre-processed product 124 is de-molded, and fired in a firing kiln/furnace to about 1200° C. to burn the binder, and sinter the pre-processed product 124. Upon a controlled cooling schedule to room temperature, a consolidated/densified cylinder is obtained that forms the product 110, and having a density of about 2 grams/cm$^3$. Other post processing steps may be carried out in step 108, such as coating, re-firing, machining, etc. Firing can be done in an electric or a gas fired furnace. Other means of heating can also be used such as microwave, infrared, or induction heating.

Ceramic forming precursor materials 118 are generally inorganic, and may optionally include other non-metallic materials such as metal oxides, and/or non-oxide compounds such as graphite, or silicon carbide. Ceramic forming precursor materials may be all crystalline or partly crystalline, and partly amorphous. To distinguish between ceramic forming precursor materials and glass-ceramics forming precursor materials, the ceramics precursor materials envisioned to be used according to the embodiments of the present invention directed to forming ceramic products, preferably produce crystalline materials in step 118, as opposed to glass precursor materials, that preferably produce amorphous materials in step 118, since glass in considered to be an amorphous material. However, it must be understood, that glass products 110 may contain ceramic (crystalline) phases, and so as ceramic products 110 may contain glass phases.

In another embodiment according to the present invention, in step 106, the recovered materials 104 are combined with a plurality of precursor materials capable of forming ceramic glazing materials. In this case the plurality of precursor materials is equivalent to a solid forming precursor 118. While still in step 106, the newly formed ceramic glazing materials may be applied over an article to form a pre-processed product 124. In step 108, the pre-processed product 124 is processed to form the product 110. Exemplarily, the article is a ceramic/clay object coated with the glazing materials, forming the pre-processed product 124. In accordance with step 108, the pre-processed product 124 is fired in a furnace to a predetermined temperature to fix the glazing over the article, followed by cooling to room temperature. In this case product 110 is a glazed ceramic/clay article glazed with the plurality of recovered materials 104. In other exemplary cases, the article may be one of a glass, metal, and cementiteous articles.

In accordance with an embodiment of the present invention, a mixture of recovered materials and the precursors is upon combination further processed in step 106 to create a pre-processed ceramic product. This is followed by shaping the mixture into a desired shape forming the pre-processed product 124. The pre-processed product 124 is subsequently sintered/consolidated in step 108 to form a solid product 110. The sintering step, which is a form of solidification, is carried out at elevated temperatures, wherein the sintering temperature depends upon the composition of the mixture. It is envisioned to form a shaped ceramic product 110 by one of the following a ceramic forming techniques, in steps 106, and 108. The ceramic forming techniques practiced at step 106, according to the methods of the present invention, include free forming (hand building techniques), casting, slip casting, stiff casting, molding, dry pressing, extrusion, hot or cold isostatic pressing, and combination thereof. It must be noted that other forming techniques are also within the scope of the present invention.

The method of forming a ceramic solid product 110 according to the present invention can be automated to accommodate higher volume production. In addition, the ceramic products 110 produced by the method of the present invention can be glazed or decorated in various ways in step 108. One method is heating the pre-processed product 124, without a glaze to sufficiently high temperature to induce sintering, and followed by cooling in step 108. Next, optionally a plurality of glazing materials are applied to the sintered pre-process product 124, in accordance with another sub-step in step 108. This is followed by re-heating to fix the glazing material (coating) onto the sintered pre-processed product 124, followed by cooling to room temperature, preferably via annealing. In one embodiment of the present invention, the glazing material can optionally incorporate a portion of the recovered materials 104. Another method is to heat the pre-processed product initially to a bisque firing temperature which is normally lower than the sintering temperature, wherein the piece is not completely sintered or is in a bisque state (semi-sintered) in step 108. This is followed by applying a plurality of glazing materials to the bisque fired pre-processed product 124, followed by heating to an appropriate temperature to induce sintering and simultaneously fix the glazing material over the bisque fired pre-processed product 124, followed by cooling to room temperature, and a glazed/coated ceramic product 110. Another method is to apply a plurality of glazes to the un-fired pre-processed product 124, and fire the combination in a one-step firing process in step 108.

In all the embodiments of the method of the present invention referenced above, the plurality of recovered materials 104 may be pre-treated before being combined/applied to make ceramic pieces, or products 110 according to the present invention. This is an optional step and may or may not be included as a part of a method step 106. The pre-treatment step according to the present invention may also include one or a combination of cleaning, washing, size reduction, homogenization, classification, oxidation, calcination, surface activation, surface deposition, and surface alteration. It should be understood that the recovered materials may well be applied as is without any further pretreatment. As it was described above as well for the products 110 made of glass in accordance with the methods of the present invention, various colorants, and dopants may be added to ceramic formulations to impart color and/or other physical and chemical properties to the final ceramic pieces 110.

Oxides, and non-oxide materials in accordance with the present invention, are combined with the plurality of recovered materials 104, to formulate a plurality of ceramic bodies to have special and unique properties. For example, aluminates, silicates, aluminosilicates, zirconates, titanates, phosphates in combination with alkaline earth metal oxides, and other metal oxides are capable of producing stable and durable ceramic materials in combination with the plurality of recovered materials 104. Upon processing the plurality of ceramic bodies in steps 106-108, the resulting ceramic products 110 can exhibit special properties related to chemical and/or physical effects. In one embodiment, the ceramic product 110 may be a transducer or an electronic ceramic, such as a ferroelectric ceramic, a piezoelectric ceramic, or a dielectric ceramic. Upon further processing in sub-steps of step 108, product 110 can be made into electronic components of an electronic circuit. These components are then used to manufacture devices with a desired function, for instance audio/video devices, sensors, and lightening devices such as LED's. The final percentage of the recovered materials in these ceramic products may be very small, potentially in parts per million, yet they incorporate a finite concentration of the recovered materials 104 in a functional device.

According to an embodiment of the present invention, a shaped green body is formed from the combination of the recovered materials 104, and a solid forming ceramic precursor 118, and optionally including a binder to provide strength to the shaped green body in step 106. The shaped green body is then sintered to produce a shaped ceramic product 110 in step 108. As mentioned before, it is possible to include the recovered materials 104 into a non-oxide ceramic body. The non-oxide ceramic bodies according to the present invention and originated from the solid forming clay precursors 118, comprise boron based, nitrogen based, and carbon based ceramics.

In accordance with yet another embodiment of the present invention, the product 110 comprises at least one solid composite precursor material 120, the at least one solid composite precursor material 120 being at least one clay or a clay precursor material. The plurality of at least one solid composite precursor material 120 comprises in this embodiment of the invention clay forming precursor materials or a combination of clay forming precursor materials and optionally other materials that are solid or liquid, or a combination thereof. Throughout the proceeding sections clay forming materials, clay forming precursor materials, solid forming clay precursors, solid composite precursor materials, and solid clay composite materials are interchangeably used. It must be understood that the difference between clay and ceramic products according to the present invention is not only associated with raw materials, and firing temperatures, but is also associated with the state of the recovered materials in the product 110. With respect to raw materials and firing temperature, while clays are the traditional source material for ceramics, ceramics may include other solids as part of the raw materials, and are typically fired at temperatures over 1000° C. The recovered materials 104, in the ceramic products 110 according to the present invention may fully or partially integrate into the molecular structure of the resulting ceramic products 110. Clay products are primarily made from natural clay materials, and the combination of a natural clay composite forming precursor 116 and the recovered materials 104 preferably exhibits plasticity through a variable range of water content, therefore permitting to create a pre-processed product 124, without a need to provide significant pressurizing/pressing, which might be the case when creating a pre-processed ceramic product. Additionally, the recovered materials 104 normally do not become fully integrated into the molecular structure of the resulting fired clay product 110 because of the lower firing temperatures that are involved in firing a pre-processed clay product 124. For that reason, the clay products are considered to be composites, as opposed to ceramics, that are considered to be non-composite. However, there is an overlap between the two categories of ceramic products and clay products, wherein the recovered materials are partially integrated into the molecular structure of the final product 110. It must be understood that the above categorization is merely intended for distinguishing between the ceramic and clay products of the present invention.

The products 110 comprising at least one solid clay composite material in accordance with the invention are one of a shaped article, an art form, an ornamental form, a functional article capable of being used to perform a function, a non-functional article, a multifunctional article, a jewelry, a block, an abstractive article, a decorative article, an article capable of providing aesthetics, and a combination thereof.

Exemplary embodiments for the clay forming precursor materials 116 comprised by the clay products 110 in accordance with the present invention are all pottery clays, kaolin, china clay, bone china, ball clay, fire clay, porcelain, stoneware clay, raku, red and white earthenware, common red clay, bentonite, fine grain sedimentary clays, and shale clays. The clay composite forming precursors 116 are presented as one of paste, powder, slurry and a combination thereof. In must be understood that any other clay composite forming precursor materials that have the ability to incorporate the plurality of recovered materials 104 and to form a pre-processed product 124 that can be processed into a product 110 are as well within the scope of the present invention.

The clay products 110 including clay potteries, according to the present invention are made by combing the plurality of recovered materials 104 and a plurality of clay composite forming precursors 116 in step 106. The plurality of recovered materials 104 may or may not need to undergo a pre-treatment sub-step before being combined with the plurality of clay composite forming precursor 116. There are numerous methods and additives that may be employed to create a pre-processed product 124. Clay has unique characteristics that allow it to form pre-processed products of almost any shape and size. The pre-processed product 124, gains strength with time as it dries, and hardens to the point that can be man handled in step 106. In step 108, the dried pre-processed product is fired at a predetermined heating rate to an appropriate firing temperature, optionally kept at the firing temperature for a predetermined period of time, followed by cooling to room temperature under a controlled cooling program (annealing), thereby forming a densified and strong clay product. Step 108, may include a glazing sub-step wherein the fired clay product is glazed and re-fired to create a final glazed clay product 110.

According to the present invention, a wide variety of clay composite forming precursors 116 may be used, depending on type, size, strength, appearance, and cost among other attributes of the desired final clay products 110. The selection of a clay composite forming precursor 116 depends on the formation of clay bodies suited to specific purposes, i.e. functional or decorative. Like ceramics, the two essential components of clays are silica and alumina. Various additives may be included with the clay composite forming precursors 116 for developing specific properties such as coloring additives to impart desired colors, fluxes to lower the melting point of the clay body during firing, and plasticizers to improve the workability and lower the water demand. Preferred clay composite forming precursors 116 according to the present invention may comprise kaolin, china clay, bone china, ball clay, fire clay, porcelain, stoneware clay, rake, red and white earthenware, common red clay, bentonite, fine grain sedimentary clays, shale clays, and a combination thereof. Other clay materials may be used not listed above, depending on availability, cost, and desirability.

According to the present invention the clay composite forming precursor 116 may be chosen among a variety of commercially available ready mix formulations. Among the advantages of ready mix formulations are the ease of use, availability, and consistency. The powdered type clay composite forming precursors 116, such as red and white earthenware, bone china, and stoneware can be combined with the recovered materials 104 and water into a plastic clay body ready for creating the pre-processed product 124 in step 106. The processing methods in step 106 include pressing, extrusion, moulding, pelletizing, casting, rolling, hand forming (free form or throwing on wheel), slip casting, and any combination thereof. Other known clay forming techniques may be employed in addition or instead of those listed above. In step 108, the pre-processed clay product 124 is fired to an appropriate firing temperature specific to the particular clay composite forming precursor(s) 116, and to the optional additives present in the formulation. Upon completion of firing, annealing to room temperature is commenced, resulting in a densified clay product. As mentioned above, a glazing sub-step may be included in step 108, to provide a glazed clay product 110.

In one embodiment of the present invention, the clay products produced in accordance with the method 100, may be coated in step 108 with a variety of coating products. The coating products may or may not comprise in their make-up the recovered materials 104. The coating methods are similar to those described before for ceramic products.

According to yet another embodiment of the present invention the plurality of recovered materials 104 may be combined with a variety of coating materials including paints, enamels, and glazes. In general, enamels, and glazes can be used to provide a coating on solid articles of clay, ceramic, glass, metals, and various composites in accordance with the present invention. In this case the articles are categorized by the method 100 either as a composite precursor/composite article 120, or solid precursor/solid article 122. This aspect of the invention allows for example a ceramic, a glass, a clay, a metal, a composite article to be coated with a coating comprising the recovered materials 104 in step 108. In this case the coating comprises all or a portion of the plurality of the recovered materials 104. In one aspect the coating is provided by combining the recovered materials 104 with a clay composite forming precursor 116 and optional additives. In another aspect the coating is provided by combining the recovered materials 104 with a glass powder and/or a ceramic powder that may or may not comprise the recovered materials. In another aspect of the invention, the coating is provided by combining a glass or ceramic powder that comprises the recovered materials 104 with other optional additives. In another aspect of the invention, the recovered materials 104 are combined with appropriate materials to make them suitable as a coating. According to the embodiments being described in this section, the articles to be coated should be capable to withstand the firing temperature of a particular coating that incorporates the plurality of recovered materials 104. In accordance with the method of the present invention, a coating is formulated such that it incorporates the plurality of recovered materials 104, in either processed or unprocessed state and is capable to be applied over articles 120, and 122 to form a coating. The coating is cured/fixed over the article by at least one of a drying, heating, radiating, polymerizing or a combination thereof in steps 106 and 108. In one embodiment of the invention the coating is analogous to a paint which becomes fixed over an article when appropriately cured. Under this scenario, the article described above is analogous to the pre-processed product 124. Application of the coating is carried out as a sub-step of either steps 106, or 108. The curing sub-step is carried out in step 108 of the method 100.

Alternatively the plurality of recovered materials 104 may be applied over a coating layer already applied over an article in step 106, and the combination of the recovered materials 104, and the coating is cured in step 108. Under this scenario, the coating acts as a substrate/medium to securely attach and/or embed the recovered materials over the article in step 108. By practicing this method of the invention the recovered materials 104 are securely, and heterogeneously incorporated over an article of choice forming the finished product 110.

Fired clay products, like ceramic products, are annealed to minimize the thermal stresses, thus providing a crack free and strong clay product. In the case of application of coatings over an article, annealing is strongly recommended to relieve thermal stresses due a potential thermal expansion coefficient mismatch between the article and the coating. Articles made of metals, metal matrix, ceramic, glass, glass ceramic, clay, and refractory cementiteous systems may be coated with a glazing or enamel incorporating the recovered materials 124 in step 106, followed by drying, and/or heating the article with the glazing or enamel coating in step 108 to fix and/or cure the glazing, or the enamel over the article, thus forming the product 110.

In accordance with yet another embodiment of the present invention, a cementiteous product 110 may be created by employing the method 100. In accordance with this embodiment of the invention, a cementiteous product 110 is provided by incorporating the plurality of recovered materials 104 into a plurality of cementiteous composite forming precursors 116. The resulting cementiteous pre-processed products 124 comprise a plurality of shaped articles that upon setting in step 108 provide a plurality of solid cementiteous products 110.

The plurality of cementiteous composite forming precursors 116 employed to create the cementiteous product 110 of the present invention are at least one of a geopolymer, a rapid setting cement, a Portland cement, a hydraulic cement, a magnesia cement, a plaster, a lime cement, a phosphate cement, an alumina cement, a pottery cement, a pozzolanic cement, and a combination thereof. The rapid setting cements of the present invention include phosphate cements, magnesia cements, and calcium sulfoaluminate cements. In addition, admixtures may be added to modify the set time and other properties of the cements.

The plurality of recovered materials 104 employed in connection with all the embodiments of the invention described above, inclusive of the embodiment concerning cementiteous products 110 are provided by a interaction 202 between biomass and at least one fluid 204, and may exemplarily be at least one of a plurality of primary solid materials, a solid effluent recoverable from an effluent resulting from the interaction between biomass and at least one fluid, a plurality of solids recovered from a liquid effluent recoverable from the interaction between biomass and at least one fluid, a plurality of solids recovered from a gaseous effluent resulting from the interaction between biomass and the at least one fluid, and a combination thereof.

The mixture of the plurality of cementiteous composite forming precursors 116 and the plurality of recovered materials 104 is capable of forming the cementiteous solid materials 110 in a fast and easy way.

According to the present invention, cementiteous products 110 are a class of composites that incorporate the plurality of recovered materials 104 into a cementiteous matrix before being cured into durable and stable cementiteous products 110. The recovered materials 104 may become an integral part of the structure of cured cement product 110 and/or they may become fillers. In either case, and in general, a relatively large percentage of the recovered materials 104 can be incorporated into a cementiteous matrix formed by the plurality of cementiteous composite forming precursor 116. To achieve a better quality product with respect to workability, set time, appearance, durability, and strength, appropriate admixtures may be also added while combining the recovered materials 104 with the plurality of cementiteous composite forming precursor 116, in step 106.

A wide variety of cement admixtures can be effectively utilized in incorporating the recovered materials 104 in the plurality of cementiteous composite forming precursor matrix, according to the present invention. They include plasticizers, super plasticizers, retarders, accelerators, water reducers, density modifiers, and durability enhancers such as metakaolin, flyash, fume silica, glass and ceramic powders, and many others. In one embodiment, the glass and ceramic powders may incorporate themselves the plurality of recovered materials 104 and be formed in accordance with the methods described above in connection with the embodiments of the invention directed to glass and ceramic products. In this case no additional recovered materials 104 need to be combined by itself with the cement. In addition, various aggregate materials may be incorporated into the plurality of cementiteous composite forming precursor such as sand, gravel, light weight aggregates, and a combination thereof. Fibers of different kinds may optionally be combined with the plurality of cementiteous composite forming precursor 116, for example for reinforcement. Fibers may be carbonaceous, inorganic or organic fibers. Examples are polymeric fibers such as nylon, Kevlar, polyethylene, and polypropylene, glass and ceramic fibers, carbon and graphite fibers, metallic fibers, and a combination thereof.

The use of rapid setting cementiteous composite forming precursors according to the present invention has the added advantage of achieving fast turn around times from combining step of 106 to the curing step of 108, and resulting in producing the cementiteous product 110 in a relatively short time.

Additives may also be added along with the plurality of recovered materials to the plurality of cementiteous composite forming precursors, including colorants, pigments, fibers, functional particles, aggregates, bioactive materials, and many others. The functional particles include density modifiers, gas formers, physical property promoters that impart magnetic, electric, and optical properties to the solid product 110. The additives include bioactive materials for example to enhance the growth of biological organisms such as corals, sea life, and plant life. Bio-cement products 110 can be produced from the mixture of a plurality of recovered materials 104 and the plurality of cementiteous composite forming precursor 116, such as a phosphate or Portland cement based systems. The bio-cement products 110 encourage and promote the growth of living cells on their surface.

According to the present invention the cementiteous products 110 may be in the form of an art sculpture, a shaped article, an art form, an ornamental form, a functional article capable of being used to perform a function, a non functional article, a multifunctional article, a jewelry, a block, an abstract article, a decorative article, an article capable of providing aesthetics, a building product, and a combination thereof. In step 106, upon combing the recovered materials 104 and the plurality of cementiteous composite forming precursors 116, pre-processed products 124 may be produced by casting, molding, pressing, free forming, machine forming, agglomerating, extruding, trawling, spraying, and other techniques. As was the case at least for the clay products 110 produced in accordance with the present invention, the plurality of recovered materials 104 may be intimately combined with a plurality of cementiteous composite forming precursors of choice 116, to create a plurality of pre-processed products 124, or the recovered materials 104 with or without a prior pretreatment, may be applied to a cementiteous composite precursor 120 in such a way that form a distinguishable phase in the respective finished solid product 110. In the processing step 108, the pre-processed cementiteous products 124 may undergo a number of processing sub-steps including hydration, reaction, crystallization, polymerization, and a combination thereof. These processing sub-steps may be carried out at either room temperature and atmospheric pressure, at above room temperatures, under various hydrothermal conditions (i.e. in an autoclave), below room temperature, under vacuum, under pressure, or a combination thereof. The choice in selecting a sub-step is dictated for example by the type of the cementiteous composite forming precursors 116 employed, type and amount of the recovered materials 104, the desired properties of the final product 110, and the desired set time/processing time. In some cases the hardening time can be adjusted with adjusting the ambient temperature, atmosphere, and use of retarding/accelerating admixtures. Cementiteous products 110 made with hydraulic type cement precursors, such as Portland cement, pozzolanic cements, calcium sulfoaluminate cement, etc. may be used under water for very long periods of times without being degraded. Such products with or without the addition of admixtures may be used to construct artificial reefs or similar under water structures and monuments. The cementiteous solid products 110 as mentioned above can also be made into a variety of shapes, and sizes.

In accordance with yet another embodiment of the present invention, the product 110 produced in accordance with the method of the present invention comprises at least one composite product comprising a polymer matrix composite forming precursor 116, and/or polymer matrix composite precursor/article 120. The plurality of polymer matrix composites of the present invention (both forming and article) includes both natural and synthetic polymers and resins.

The at least one polymer composite product 110 is processed from at least one pre-processed product 124 that is obtained by combining the recovered materials 104 with at least one of a polymer matrix composite forming precursor 116, and/or polymer matrix composite precursor/article 120. The polymer matrix composite forming precursor 116 incorporates the recovered materials 104 with or without a prior treatment, as an integral part of the pre-processed product, either homogenously or optionally heterogeneously. The pre-processed product is subsequently processed according to the method step 108 to form the polymer composite product 110. On the other hand, when a polymer matrix composite precursor/article 120 is to be used, the plurality of recovered materials 104 is incorporated into or over the polymer matrix composite article 120, such as regionally and/or locally, as a coating, as a base, as a discrete phase, and combination thereof.

A natural resin such as amber can be used according to the present invention to incorporate the recovered materials 104 in a dispersed or aggregate form. Upon competition of method steps 106 and 108, the resulting polymer composite product 110 incorporating the recovered materials 104 in amber can be used as a healing agent or as jewelry. Another example of a natural resin that may incorporate the recovered materials 104 is Kauri gum, a fossilized resin extracted from kauri trees. Under these scenarios, the natural resin is viewed as either a polymer matrix composite forming precursor 116, or optionally, as a polymer matrix composite precursor/article 120, preferably as a polymer matrix composite forming precursor 116.

The synthetic polymers are envisioned to be used as a polymer matrix composite forming precursor 116 as well, and include both thermoplastic and thermosetting resins/polymers. Examples of thermoplastic polymers suitable for use in the present invention are: polyethylene, Teflon, polystyrene, polypropylene, polyester, polyurethane, polyvinyl chloride, nylon, rayon, celluloid, polycarbonate, Polymethyl methacrylate (PMMA), silicone, and other thermoplastic precursors that are chemically and/or physically compatible with the recovered materials 104. Examples of thermosetting synthetic polymers envisioned to be used in the present invention include but are not limited to vulcanized rubber, Bakelite, Kevlar, epoxies, phenolics, such as phenol formaldehyde resins (PF), polyesters, and other thermosetting precursors that are chemically and/or physically compatible with the recovered materials 104. It must be understood that other commercially available thermoset and thermoplastic polymers that are capable of forming stable and durable products with the recovered materials are as well included within the scope of the present invention.

In accordance with another embodiment of the present invention, liquid crystal polymers may also be used as a plurality of polymer matrix composite forming precursors 116, that are capable to incorporate the recovered materials 104 with or without a prior pre-treatment step. Such liquid crystal polymer embodiments for the present invention can be used to fabricate a polymer dispersed liquid crystal device.

In combing step of 106, in addition to the recovered material 108, and the polymer matrix composite forming precursor 116, other additives may as well be used in creating the pre-processed product 124. These additives include fibers of carbon, graphite, cellulose, polymers, glass, and ceramics. Other envisioned additives include functional fillers, color pigments and coloring agents, texturing materials, decorative and protective coating materials. Additives, comprising glass, ceramic, and polymers may include the recovered materials 104 in their make ups. In this case, the recovered materials 104 may optionally be excluded in combining step 106.

According to the present invention, the color and texture of the polymer composite product 110 may be adjusted by the addition of colorants, dyes, and pigments suitable for the particular polymer matrix composite forming precursor 116 from which the polymer composite product 110 is made. Functional additives and dopants such as those to induce texture, translucency or opacity, phosphorescent, fluorescence, machinability, ferromagnetism, biocompatibility, and bio-activity, can be added in step 106 while combining the recovered materials 104 with the polymer matrix composite forming precursor 116 to form the pre-processed product 124 of method step 106, or can be applied to the polymer composite product 110 in a series of post processing steps not shown in FIG. 1. Other option in connection with adding additives is to include them in the polymer matrix composite forming precursor 116 before the combining step 106.

In accordance with an embodiment of the invention, the plurality of recovered materials 104 with or without one or more pretreatment steps, is combined with the polymer matrix composite forming precursor 116 in step 106 by a melt infusion process. The resulting preprocessed product 124 may optionally be heated in step 108 to fully cure the polymer matrix. Heating may be carried out under steam pressure, or optionally under atmospheric pressure.

The polymer matrix composite forming precursor 116 before, during, or after incorporating the plurality of recovered materials can be doped/stuffed with particles of metals, glass, ceramics, wood(s), oxides, fire retardants, and many others to impart to the polymer composite product 110 strength, texture, color, stability, non-flammability, and other desired attributes. Wood composite objects/wood polymer composites (WPCs) comprise the recovered materials 104 combined with one or more of the variety of wood composite precursors and/or a wood forming composite precursors containing materials made of wood fiber/chips/strands and a plurality of polymers. An example is engineered wood products comprising the recovered materials as a filler, and can be made into various functional forms and artistic shapes and forms.

The polymer matrix composite forming precursor 116 while being combined with the recovered materials in step 106, may be in powder and/or aggregate forms. In another embodiment, the polymer matrix composite forming precursor 116 may be in a melt state while being combined with the recovered materials 104.

The recovered materials 104 may be combined in step 106 with the polymer matrix composite forming precursor 116 and other additives as mentioned above, or optionally, may be combined with a polymer matrix composite article 120 in creating a plurality of pre-processed products 124. In step 108, the plurality of pre-processed products 124 are manufactured and/or processed into a plurality of polymer composite products 110. The amount of recovered materials 104 that can be added to the polymer matrix composite forming precursor 116 according to the present invention can vary from 0.001 wt % to as much as 90 wt % of total mass of polymer composite products 110, or as much as possible before degrading the strength, stability, and durability of the polymer composite products 110. In some cases this percentage may be from 0.1 wt % to 40 wt % depending for example on the availability of recovered materials 104, and shape, size, numbers, and physical characteristics of the polymer composite products 110.

According to the present embodiment of the present invention, the processing step 108 can be selected from one or a combination of casting, injection molding, extrusion, pressing, pulling, compression and transfer molding, and other conventional and commercial manufacturing techniques which are to be considered within the scope of the present invention.

According to further teachings of the present invention, the polymer composite products 110 may be solid, hollow, or a combination thereof. The polymer composite products 110 can be fabricated with shapes varying from simple geometrical to complex shapes. The products made as a result of combining the recovered materials 104 with the plurality of polymer matrix composite forming precursors 116 are capable of having a wide range of colors, sizes, and properties. The polymer composite products 110 can be stand products or be a part of another system/component/device. The polymer composite products according to the present invention can be subjected to a post machining or shaping/forming step to create the final desired polymer composite products 110. These include but are not limited to mechanical processes, such as drilling, cutting, polishing, slicing, engraving, and mounting, chemical processes such as chemical etching, thermal processes such as softening/re melting, physical processes, such as coating, coloring/painting, writing, etc.

In all the embodiments according to the present invention, the plurality of recovered materials 104 can be homogenously or heterogeneously combined with the plurality of polymer matrix composite articles 120, such as being encapsulated, coated, and a combination thereof in step 106, and further cured and fixed into/onto the polymer matrix composite articles 120 in step 108 to form the final desired polymer composite products 110.

In accordance with another embodiment of the present invention, the product 110 is a metal matrix composite product. The metal matrix composite product 110 created in accordance with the method of the present invention comprises at least one of a plurality of metal matrix composite forming precursors 116 and the plurality of recovered materials 104. Other materials may also be present in the metal matrix composite product 110 of the present invention, either as particulates, fibers, and functional and non-functional fillers. In addition, the recovered materials 104 may alternatively be combined with a metal composite precursor 116 and/or with a plurality of articles composite precursor 120 in step 106 of method 100. In either case, the combination of various metals with the plurality of recovered materials 104 provides the opportunity for the creation of a wide variety of metal matrix composite products 110.

In accordance with one embodiment of the present invention, the plurality of metal matrix composite forming precursors 116 may comprise a single metal and/or a metal alloy. The plurality of metal matrix composite forming precursors 116 when combined in step 106 with the plurality of recovered materials 104, results in one or a combination of encapsulation, embedding, adhering of grains/particles of the recovered materials by the metal matrix composite forming precursors 116. Non-ferrous metals and metal alloys such as aluminum, and aluminum alloys with silicone, copper, manganese, nickel, and magnesium, copper, brass, bronze, tin, zinc, lead, titanium, silver, sterling silver, gold, platinum, and ferrous metals such as iron, and alloy steel alone or in combination, provide a suitable metal matrix composite forming precursors 116 with the plurality of recovered materials 104, in the step 106 of the method 100 of the present invention.

Additives, comprising fillers and reinforcement materials may also be used in combination with the plurality of recovered materials 104 and metal matrix composite forming precursors 116 to impart specific properties to the metal matrix composite product 110 of the present invention. Additives may also include fluxes, pigments, ceramic and glass particles, texturing particles, etc. The fillers may include other metal particles, functional powder materials, and refractory materials. The reinforcement materials may include refractory fibers of oxides, non-oxides, carbon, and graphite. In one aspect of the invention, glass, ceramic, and other fillers and/or fibers may comprise the recovered materials 104 therein. In this case, direct addition of the recovered materials 104 may optionally be excluded in the combination step 106. Consequently, the pre-processed product 124 comprises the metal matrix composite forming precursors 116, and the additives, thus introducing the recovered materials indirectly into the pre-processed product 124.

The criteria for selecting an appropriate metal matrix composite forming precursor 116 includes the desired appearance of the metal matrix composite product 110, the cost of the metal, and the processing cost which primarily depends on complexity of the processing steps 106, and 108. A wide variety of metal matrix composite products may be created according to the methods of the present invention, and practically all conventional metals and metal alloys can be used to manufacture the metal matrix composite product 110. In one aspect precious metals or metal alloys such as platinum, gold, silver, sterling silver, may be used as the metal matrix composite forming precursors 116, resulting in the metal matrix composite products 110 which optionally may be worn as jewelry on their own or in combination with other precious materials or semi-precious and precious stones. It is understood that all metals and metal alloys capable to form suitable pre-processed products with the plurality of recovered materials 104, that satisfy the quality criteria for metal matrix composite products 110 are within the scope of the present invention.

The metal matrix composite products 110 according to the present application, may be produced by several different processing techniques. The combination step 106 may be performed by hot working the metal matrix composite forming precursors 116, and the recovered materials 104, or cold working/forming the metal matrix composite forming precursors 116, and the recovered materials. In one aspect, if the recovered materials 104 are temperature sensitive, then cold working is the likely method employed. The pre-processed products 124 created in step 106, are finished in the processing step 108. The finishing processes may include mechanical, thermal, and chemical processes. Examples of mechanical processes are cutting, welding, joining, drilling, polishing, bending, rolling, etc. Examples of chemical processes are coating, etching, etc. Examples of thermal processes are heating to soften the metal, etc.

In general a plurality of techniques are envisioned to combine the recovered materials 104 with the metal matrix composite forming precursors 116, and optional additives in accordance with step 106 of the method 100 of the present invention. These techniques include melting the metal matrix composite forming precursors 116 and infiltration of recovered material by molten metal via squeeze casting, thixocasting, and vacuum infiltration or pressure infiltration. Also, another technique includes reaction infiltration of the recovered materials 104 in powder form by stirring the powder particles in the molten metal matrix composite forming precursors 116, followed by sand casting, permanent mold casting or high pressure die casting. Yet, another technique includes a powder metallurgical process carried out by pressing and sintering and/or forging the powder mixture of recovered materials 104, and metal matrix composite forming precursors 116 powders, followed by optional extrusion or forging the combined powder mixture. Another technique is to hot press isostatically the combined powder mixtures into a desired shape. Regardless of the combining technique used in step 106, the pre-processed product 124 is finished in step 108 as described above to form the final metal matrix composite product 110.

In one embodiment of the present invention in step 106 the plurality of recovered materials 104 are ground to fine powders and introduced into a melt of a metal matrix composite forming precursors 116, while being stirred. In order to avoid gas entrapment, the metal melt is stirred such that no agglomeration of powders occurs, and no appreciable volume of gas is entrapped. The metal melt may be cast directly or alternatively squeeze casted. In one example, copper is used as the metal matrix composite forming precursor. Next, copper is melted in a refractory crucible at above 1100° C. (while the melting temperature of copper is 1084° C.). A predetermined amount of a recovered material 104, primarily comprising bone powders, is added to copper melt while being stirred. The combined weight % (wt %) of the recovered materials is about 5 wt %. Alternatively the combining step could be carried out by a gas pressure infiltration method. In this case, the copper melt infiltrates the recovered materials 104 which are placed inside a pressure vessel, and pressurized by a gas from outside the pressure vessel. The gas should be inert with respect to the metal matrix composite forming precursors 116 used, with nitrogen or argon being exemplary gases that may be used. In either case, the melt is directly casted into a thin strip, and allowed to cool to room temperature to form the pre-processed product 124. The strip is forged to form a rectangular foil. The foil is textured (hammered) into an artwork, forming the final metal matrix composite product 110.

In another aspect of the invention, instead of using copper, silver is used as the metal matrix composite forming precursor 116. The melt temperature is about 1000° C. (while silver melts at 961° C.). After combining with the recovered materials 104 in the same manner as described in connection with the example above, the combination is cast into a round pellet forming the pre-processed product 124. In step 108 the pre-processed pellet is sanded and polished, and date and letters may be engraved on the pellet to form the final metal matrix composite product 110. If the same process is to be repeated with gold being the metal matrix composite forming precursor 116, then the melt temperature should be about 1100° C. (while gold melting temperature is 1063° C.). Similarly, if the same process to be repeated with brass being the metal matrix composite forming precursor 116, then the melt temperature should be about 1000° C. (while brass melting temperature is 930° C.).

According to the method step 106 of the present invention, there are at least two possible ways to perform gas pressure infiltration: First, a plurality of preheated recovered materials 108 are dipped into a melt of a plurality of metal matrix composite forming precursors 116, and then the gas pressure is applied to the surface of the melt, leading to the infiltration of the molten metal into the plurality of recovered materials. Second, the gas pressure infiltration steps are reversed in order. In this case, the molten metal is pressed into the plurality of recovered materials 104, as opposed to being forced in. The advantage of gas pressure filtration, regardless of variations, is that it creates essentially pore free solid pre-processed products 124, and can be done in a relatively short time. Melt casting can be done with one of sand casting, die casting, investment casting, or other conventional casting methods in steps 106.

Squeeze casting or pressure casting is another way to form the pre-processed product 124. According to this embodiment in step 106 of the method 100, a mold containing the plurality of recovered materials 104 is slowly filled with a melt of the plurality of metal matrix composite forming precursors 116, followed by pressurizing the mold. This leads to the formation of a dense pre-processed product 124. As the result of high pressurization, the squeeze-casted pre-processed product 124 is practically pore free and dense. In one aspect, the casting is performed in two stages in step 106. In the first stage the melt of a plurality of metal matrix composite forming precursors 116 is combined with the recovered materials 104 by pressing at relatively low pressure. Then the mold is subjected to higher pressure in stage 2, to solidify and form the pre-processed product 124.

In another aspect of the present invention, metal ions from a solution of a plurality of metal matrix composite forming precursors 116 is electroplated onto the surface of the recovered materials 104. If the plurality of recovered materials 104 are in powdered and/or aggregate forms, then the electroplated powders/aggregates can be consolidated by one of pressing and/or sintering, or extruding to create the pre-processed product 124 in step 106. Alternatively, a plurality of metal matrix composite forming precursors 116 may be vaporized by various means such as plasma, and be deposited over the powders/aggregates of the recovered materials 104 in the vapor phase, forming a plurality of recovered materials 104 coated with a vaporized metal from the plurality of metal matrix composite forming precursors 116. The metal coated particles/aggregates are consolidated into a desired pre-processed product 124 from which a final metal matrix composite product 110 is derived.

According to the present invention, the pre-processed product 124 is processed into the desired metal matrix composite product 110 in step 108. The processing includes various mechanical processing steps such as machining, milling, rolling, drawing, grinding, polishing, engraving, and various hot and cold working. The metal matrix composite product 110, obtained in accordance with the present invention may be made into a shaped article, an art form, an ornamental form, a functional article capable of being used to perform a function, a non-functional article, a multifunctional article, a jewelry, a block, an abstractive article, a decorative article, an article capable of providing aesthetics and a combination thereof. It must be understood that other pre-processing and post processing steps that are not specified above, aiming to provide any particular shape and form to the metal matrix composite product 110 are also within the scope of the present invention.

In accordance with yet another embodiment of the present invention, the plurality of recovered materials 104 may also be combined in step 106 with a composite forming precursor 116 that comprises at least one of a composite paint forming precursor, a composite dye forming precursor, a composite ink forming precursor, a composite color coat forming precursor, composite decorative coat forming precursor, and a composite functional coat forming precursor. The composite forming precursors in this category may be in the form of a plurality of solid powders, a plurality of liquids, a plurality of gels, a plurality of liquefiable substances, a plurality of binders, a plurality of additives, and a combination thereof. After the recovered materials 104 is combined with one or more of the above composite forming precursors, a plurality of at least one of a composite paint, composite dye, composite ink, composite color coat, composite decorative coat, and composite functional coat are created. As part of the process in step 106, the resulting composites regardless of type, are subsequently applied over a surface to create a plurality of pre-processed products. In step 108, the plurality of pre-processed products are processed to produce a corresponding final product 110. The corresponding final product may be further defined according to the type of composite forming precursor used in step 106 to create the pre-processed product 124. For example if the composite was created from combining a paint composite forming precursor 116, and the recovered materials 104, then the product is identified as a paint composite product 110.

Furthermore, the plurality of recovered materials 104 may also be combined in step 106 with a plurality of composite precursors (articles) 120, and/or solid precursor (articles) 122 to create a plurality of pre-processed products 124. The composite article (or precursor) comprising at least one of a plurality of paintings, a plurality of ink drawings, a plurality of dyed substrates, a plurality of graphics, and a combination thereof. The solid articles 122 comprise at least a plurality of substrates, a plurality of surfaces, and a combination thereof. The plurality of pre-processed products 124 are processed to fix and/or cure the recovered materials 104 over the composite articles and/or solid articles in step 108, resulting in the corresponding final product 110. Exemplarily, the solid plurality of recovered materials 104 are applied over an existing painting 120, and using an appropriate medium to create a pre-processed painting product 124 in step 106. Processing is carried out by the pre-processed painting product 124 in step 108, by allowing the applied solid material to cure, resulting in a paint composite product 110. Another example is, applying the recovered materials with an appropriate medium over a glass cup (solid article) 122 to create a pre-processed product 124 in step 103. This is followed by curing the medium by air drying, thereby fixing the recovered materials over the glass cup in step 108, and forming a paint solid product 110.

Preferably, the plurality of recovered materials 104 are utilized in this embodiment of the invention after having been pre-processed into a fine powdered form. Further, in this embodiment of the invention the presentation of the plurality of recovered materials 104 may be either as a solid, a liquid with fine solid suspensions or a combination thereof.

The paints, inks, dyes, and coatings produced as discussed above all share the quality of imparting at least one of a color, a shade, a feature, and a combination thereof to a surface. The paints created by the present invention can be in the form of a liquid, a semi liquid, a semi solid, or solid. Paint composite forming precursors 116 according to one embodiment of the present invention comprise one or more of a plurality of lacquers, a plurality of varnishes, a plurality of oils, a plurality of pigments, a plurality of fillers, a plurality of additives, a plurality of enamels, a plurality of latex paints, a plurality of water based paints, a plurality of oil-based paints, a plurality of waxes, a plurality of UV cure paints, a plurality of artist paints, a plurality of solid paints, a plurality of color paints, a plurality of transparent paints, and a plurality of specialty paints.

According to the present invention, the plurality of recovered materials 104 when combined with a plurality of paint composite forming precursors 116, are capable of acting as a pigment, a filler, and an additive in the resulting paint. The plurality of recovered materials 104 in this role may act as an inert part and/or a functional part of the resulting paint.

Optionally, the plurality of recovered materials 104 according to one embodiment of the present invention, may be applied over a paint composite article 120 (e.g. a painting, also may be a painted surface), as a discrete phase, thus being recognizable in the paint composite product 110. In such as case, the recovered materials with or without a prior treatment may be applied in combination with an appropriate medium that fixes the recovered materials 104 securely to the composite article 120. The medium may be selected from a variety of products such as liquid glues, artist paints, varnishes, etc. In another aspect, the recovered materials 104 may be pre-processed into glass, ceramics, glass ceramics, various composites according to the methods of the present invention prior to being combined with a paint/coating composite forming precursor 116. It also can be applied directly applied over a composite article or solid articles 120, and 122 respectively, by making the receiving surface of the composite and/or solid article adaptable to receive the recovered materials with or without pretreatments. According to the present invention, for example an existing painting is considered to be a composite article 120, whereas for example a glass cup is considered to be a solid article 122.

In accordance with another embodiment of the invention, a paint composite forming precursor 116 is combined with the recovered materials 104 in step 106 to create a paint. The same process as described herein is applicable for creating dyes, inks, color coats, decorative coats, and composite coats in accordance with the present invention. As a part of step 106, the resulting paint is used to create a painting, or be added on to an existing painting. According to the present invention, the created painting, and the existing added-on painting are both considered the pre-processed products 124. The above pre-processed products 124 are subsequently processed in step 108 to create the paint composite product 110. The processing in this case is drying and/or curing and/or fixing the paint or coating materials over the surfaces that are created in step 106. The surface, or substrate to receive the paint or coating according to the present embodiment of the invention is a plurality of at least one of a canvas, a wood, a paper, a cellulose based substrate, a metal, a stone, a glass, a ceramic, a glass ceramic, a polymer composite, a clay based composite, a plastic, a metal based composite, a fabric, a fiber glass, animal skin, a human skin, and a building material.

Additives including pigments and fillers may be used in creating a paint or coating in step 106. Pigments are granular solids incorporated in the paint, primarily to impart color. Fillers are granular solids incorporated into paint to impart functionality to the paint such as body, toughness, texture, and to give the paint special properties. As mentioned above the plurality of solid materials 104 can act as either one or both the pigments and the fillers. In one aspect, the recovered materials 104 as a part of their pretreatment are converted to a glass/glass ceramic product according to the method of the present invention, and thereafter ground to powders.

Furthermore, the additives according to the present invention can be classified as either of natural or the synthetic type. Natural additives may include various clays, calcium carbonate, mica, silica, titania, and talc. Synthetic additives may include engineered materials including the plurality of recovered materials 104 with and without treatment.

As mentioned above, the plurality of the recovered materials 104 may be subjected to pre-treatment steps before being combined with a paint composite forming precursor 116 in step 106. The pre-treatment process according to the present invention includes the conversion of a plurality of recovered materials 104 to glass, glass-ceramics, ceramics, and other composites. For example, the plurality of recovered materials 104 may be in the form of fine glass powders, ceramic powders, clay powders, composite powders, cementiteous powders, or a combination thereof while they are combined with a paint composite forming precursor 116 in step 106. The above referenced conversion of the plurality of the recovered materials 104 to solid products such as glass, glass-ceramics, ceramics, and other composites takes place prior to the combining step 106.

For example, a special effect paint may be formulated according to the present invention. The optical special effect materials are capable of producing optical effects. These effects include but are not limited to the capability of shifting the wavelength of incident light, color shifting, florescent, phosphorescence, and luminescence. In one aspect of the present invention, the recovered materials 104 are coated or impregnated with the optical special effect materials before being combined in step 106. In another aspect of the invention, the plurality of the recovered materials 104 may be pre-treated with coloring materials and/or with a plurality of binding agents. In addition, the plurality of recovered materials 104 may also be coated or impregnated with chemical and physical special effect materials capable of providing a plurality of chemical, electronic, and magnetic properties to the recovered materials 104. For example, the special effect can be induced by electronic or magnetic signatures of the materials that the recovered materials 104 were treated with. Those chemical and physical signatures in turn can be identified in all the products of the present invention, more specifically in all the composite products of the present invention, and be traced back to the corresponding recovered materials 104 used in step 106. As an example, a paint composite product 110 can be identified with an appropriate physical property reader, and the results may be traced back in a data-base to the recovered materials 104 used in creating the paint composite product 110.

In addition, other additives can also be introduced into the pre-processed products 124 either with the recovered materials 104, or directly introduced during the combination step of 106. These additives are capable of imparting properties to the final products that are unique. Exemplarily, the additives may be in the form of liquid crystals that can be used in combination with the plurality of recovered materials 104 for making thermochromic paints that change color when heat is applied. According to the present invention, color changing paints can also be made by adding halochrome compounds or other organic pigments as additives in step 106 of the method 100.

According to the present invention, the type of paint that is introduced with the composite forming precursors 116 includes a plurality of oil paints, alkyd oil paints, acrylic paints, watercolor paints, gouache paints, tempera paints, encaustic paints, Fresco paints, organic base paints, and water base paints.

In accordance with another embodiment of the present invention, a paint created/formulated in step 106 with a plurality of the recovered materials 104, and a paint composite forming precursor, is applied over an existing painting, or serves to start a painting anew to create the pre-processed product 124.

In another embodiment of the present invention, a plurality of recovered materials 104, with or without pre-treatment is used to create a paint according to the method of the present invention. The method comprises combining a plurality of recovered materials 104, with a paint composite forming precursor in step 106. The paint is either applied over an existing painting or is used to start a painting anew to create the pre-processed product 124. In one aspect, the source of biomass from which the recovered materials 104 is obtained is a plurality of hair, and/or nails from a living or deceased person or animal. In this case a paint composite product 110 is produced without the person or animal being cremated or subjected to an alkaline hydrolysis method.

According to the embodiments of the present invention, the weight percentage (wt %) of the plurality of recovered materials 104 in a paint product made by combining the plurality of recovered materials 104 with a plurality of paint composite forming precursor 116, and optional additives in step 106, varies from 0.001 wt % to 90 wt %, preferably from 0.01 wt % to 70 wt %, and most preferably from 0.1 wt % to 50 wt %. These weight percentages apply for both cases when the paint product is used to create either a new or reworked pre-processed product 124 in step 106, followed by drying/curing processing in step 108 leading to the final product 110. As discussed above, in another embodiment of the present invention the paint product may be optionally applied externally over an already painted area or over an article.

In one aspect of the present invention, the plurality of recovered materials 104 are finely ground, to have an average particles size less than 200 mesh. The finely ground plurality of recovered materials 104 are combined with an oil based paint forming precursor 116 in one embodiment, and a water base paint forming precursor 116 in another embodiment at a level of about 2 wt % of the plurality of recovered materials 104, in step 106. In the case of oil base paint, appropriate oils such as linseed oil, turpentine or white spirit may be added to adjust the viscosity of the resulting paint. In the case of water base paint, water can be used to adjust the viscosity of the resulting paint. Each of the resulting paints is used independently to create a painting in step 106, forming the pre-processed product 124. Upon completion of the drying process in step 108, two paint composite products 110 are produced, one oil based, and the other one water based.

According to the present invention, the plurality of paints, dyes, inks, and coatings may be applied to a surface in step 106 with manual hand brushes/tools, air assisted devices, electric assisted devices, printers, plotters, graphic equipment, tattooing equipment including tattooing tools and devices, pens and pencils, crayons, markers, manual devices, sprayers, and other commercial and specialized means and devices.

Paints, dyes, inks, coatings made in accordance with the method of the present invention can be applied to articles that contain a plurality of recovered materials 104 in their makeup. These articles are made in accordance with the embodiments of the present invention, but generally any other suitable solid or composite articles may be included. For instance, a clay, glass, ceramic, glass ceramic, metal matrix, cementiteous, painting/coating or a combination thereof product made according to the embodiments of the present invention that contains a plurality of recovered materials 104 may be included. This is a useful embodiment when multiple recovered materials 104 from multiple biomass sources are to be applied over a single article or product. For example, a paint/coating product comprising recovered materials 104 from biomass A is applied over a ceramic product comprising recovered materials from biomass B. Another example is a painting that comprises multiple paint products created from multiple recovered materials, wherein the recovered materials are from interaction of multiple biomasses, i.e. from a number of family members, a family tree, pets, pets and owners, and so on. This concept also applies to other embodiments of the present invention.

In accordance with one embodiment of the present invention, multiple product streams belonging to multiple biomasses can be combined into a single or multiple solid products 110.

Further exemplary embodiments of the present invention are shown bellow.

In one exemplary embodiment of the present invention, about 100 grams of cremation ash originated from a cremated dog is interacted with about a liter of fluid comprising a disinfectant solution of 1:10 with household bleach and water (i.e. 1 part bleach and 9 parts water). A slurry effluent is created, which is then filtered to extract a solid effluent portion. The extracted solid effluent portion is rinsed several times with tap water. The resulting liquid effluent is a diluted bleach solution having a concentration of bleach which is allowed to be discarded in the drain according to the instruction provided with the bleach product. The recovered solids were allowed to air dry first, and then oven dried at 200 C. for 2 hours. Upon cooling to room temperature, the recovered materials are ground to below 200 mesh screen. The ground recovered solids 104 is combined with the following composite forming precursors at a level of 1 to wt %:portland cement/water, molten polyethylene polymer, and an artist paint/linseed oil. Corresponding products are made in the form of casts from cement and polymer, and painting from paint.

In accordance with another embodiment of the invention, about 200 grams of a dog cremation remains as received from a crematory, forming a biomass 202 is interacted with about one liter of 1 molar aqueous solution of sodium hydroxide forming the fluid 204. Interaction is continued for 8 hours at room temperature. The effluent 220 is filtered using a medium-coarse filter paper to separate a solid effluent 210 from a liquid effluent 220. The solid effluent is a clean remains without visible carbonaceous residue and without very fine powdery materials. The liquid effluent is further diluted, neutralized with hydrochloric acid to about a pH 6-8 and is discharged. The solid effluent 210 forms the plurality of recovered solids 104. About 10 grams of the recovered solids is ground and is added to about 500 grams of a molten soda lime glass, solid forming precursor 118, in a refractory crucible and is stirred well with an Inconel® rod. After about 30 minutes, the glass is poured out into an abstract shape over a stainless steel plate, followed by annealing the poured glass in an annealing oven to room temperature. In this case the majority of the recovered materials are dissolved in the molten glass, with a minor amount left undissolved.

In accordance with an exemplary embodiment, about 20 grams of the recovered materials 104 obtained above are combined with about 480 grams of a plurality of rapid set phosphate based cement composite forming precursor 116 at a ratio of 1 part recovered solids, and 24 parts cement precursor. A sufficient amount of water was added to the combined powders to obtain a workable paste, and is immediately casted into a half shell ceramic mold which was prepared with the application of a mold releaser. After air curing for about 2 hours the half shell mold was opened and the result was a composite cementiteous product which could be handled after demolding.

In accordance with another aspect of the present invention is proposed a system, comprising a combination of a plurality of products capable of creating the system. The plurality of products comprises at least a first product and a second product, and may comprise as many products as desired, up to the nth product. The first product comprises a combination of a plurality of first recovered materials, the plurality of first recovered materials being provided by an interaction between a first biomass and at least one fluid, and at least one precursor material. The second product comprises a combination of a second plurality of recovered materials and a second precursor material, and the plurality of second recovered materials is provided by an interaction between a second biomass and at least one fluid. The nth product comprises a combination of a nth plurality of recovered materials and an nth precursor material, and the plurality of nth recovered materials is provided by an interaction between a nth biomass and at least one fluid. In accordance with the proposed system the second precursor material is comprising the first product, and the nth precursor material is comprising the (n−1)th product. In another related aspect of the present invention, the plurality of recovered materials may be optionally pre-combined with a plurality of solid forming or composite forming precursor materials before being combined with the corresponding plurality of products.

Figure 5:
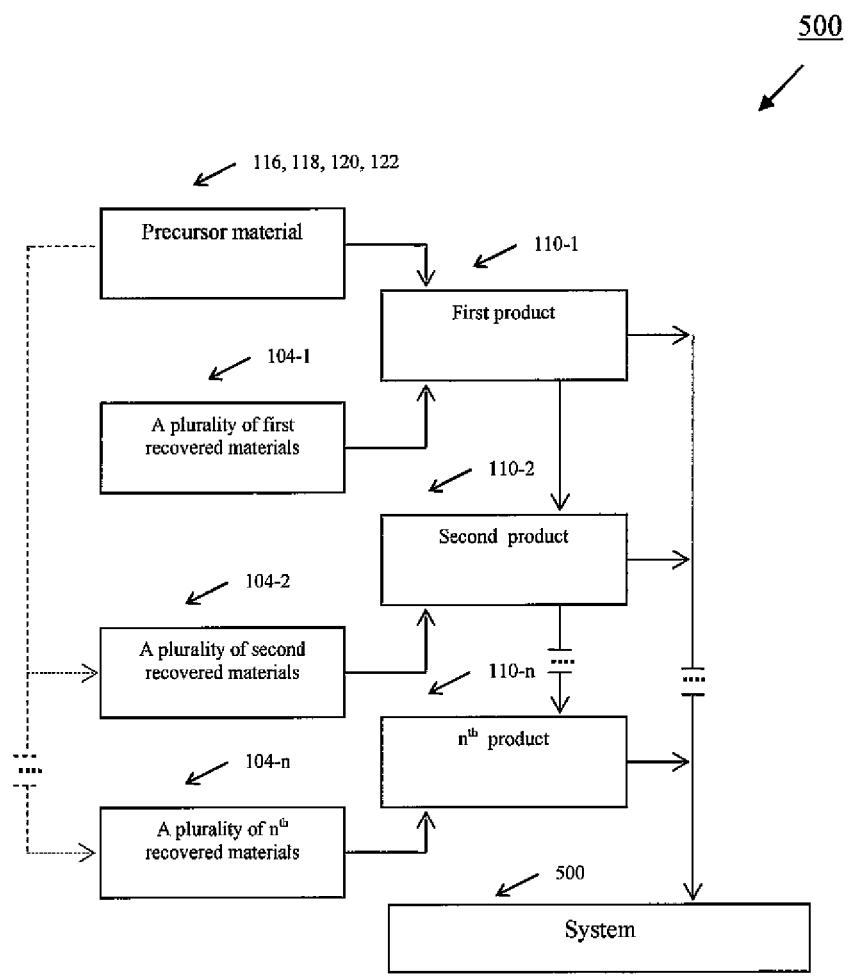
FIG. 5 is a block diagram illustration of a system in accordance with an embodiment of the present invention.

Referring now to the illustration of FIG. 5, FIG. 5 is a block diagram illustration of a system in accordance with the present invention.

According FIG. 5 a system 500 comprises at least one precursor material. The precursor material may be one of a composite forming precursor 116, solid forming precursor 118, composite precursor 120, and solid precursor 122, or a combination thereof. A detailed description regarding the type and nature of the at least one precursor material 116, 118, 120, and 122 has been provided in this document at least in connection with the embodiment of the invention illustrated in FIG. 1 and in connection with the various embodiments of the invention that envision the product 110 as being a glass product, a ceramic product, a glass ceramic product, a paint, a cementiteous product, a clay product and others as described above. All those precursors are contemplated as incorporated within the precursor illustrated in FIG. 5.

In accordance with the illustration made in FIG. 5 the first product 110-1 comprises a combination of a plurality of first recovered materials 104-1, wherein said plurality of first recovered materials 104 is provided by an interaction between biomass 202 and at least one fluid 204, and at least one precursor material. The second product 110-2 comprises a combination of a second plurality of recovered materials 104-2, and a second precursor material, wherein the second precursor material comprises the first product 110-1.

The second plurality of recovered materials 104-2 may or may not be pretreated before being combined with the first product 110-1. In addition, the second plurality of recovered materials may optionally be combined with one or more precursors or any other materials before being combined with the first product 110-1. The same situation applies to the $3^{rd}$, $4^{th}$, ... and $n^{th}$ plurality of the recovered materials, prior to being combined with the corresponding $2^{nd}$, $3^{rd}$, ... and $(n-1)^{th}$ products respectively.

As for the system 500, the cycle illustrated in FIG. 5 can repeat itself a third, fourth (not shown), and n.sup.th products. For example the third product 110-3 (not shown) is created by combination of a third plurality of recovered materials 104-3 (not shown) with product 110-2 which already comprises product 110-1.

In one exemplary embodiment according to the present invention, the system 500 comprises a painting. In this case, product 110-1 is a painting that is created by combining a first plurality of recovered materials 104-1 with a composite forming precursor 116, or optionally with a composite precursor/article 120. Next, a second plurality of recovered materials 104-2 with or without pretreatment is combined with the product 110-1 which may be considered as a composite precursor/article 120. In one aspect of the present embodiment, the second plurality of recovered materials 104-2 may optionally be combined with a paint composite forming precursor material 116, before being combined with the product 110-1. Processing the combined second plurality of recovered materials 104-2, with the product 110-1 results in the creation of product 110-2. The cycle may be repeated with additional pluralities of recovered materials as the system expands and grows.

The system 500 of the present invention allows the integration of recovered materials from various sources of biomass, hence memorializing a larger number of individuals with one system of art.

Another exemplarily system 500 is conceived of glass. In this case the first product 110-1, is utilized as a host glass 122 for the second plurality of recovered materials 104-2, and so on. In the examples provided, the products have the same composition, i.e. same type. This also applies to situations where the first, second and nth products may not have the same composition, and potentially have different make-ups, but can be integrated into a system. For example, a glass jewelry comprising the first recovered materials 104-1 is integrated into a metal matrix ring that comprises the second plurality of recovered materials 104-2.

The solid product 110 made according to the present invention may be traced to the biomass 202 it originated from. The traceability means in accordance with the present invention comprise at least one of a microchip, a chemical tracer, a physical tracer, a radio frequency identifier (RFID), a UPC bar code, a DNA marker, and a combination thereof.

The information related to the particulars of the biomass 202, the information related to the interaction of the biomass with a fluid 102, the information related to the particulars of processing the pre-processed product 108, and regarding the resulting product 110 are all or partially stored in a plurality of secured computerized database systems. The information is retrievable, and can provide a comprehensive pedigree of the biomass 202 that is being converted to the solid product 110.

In one embodiment of the invention, a radio frequency identification (RFID) tag is used to trace a biomass 202 to a solid product 110. According to an exemplary embodiment, an RFID tag is included with the plurality of recovered materials 104 when the plurality of recovered materials 104 leaves the facility where they were produced. An RFID reader transmits radio waves that activate the RFID tag, which in turn transmits information via a pre-determined radio frequency. This information is captured and transmitted to a database. The RFID tags preferred in accordance with the present invention require no battery and are powered by the electromagnetic fields used to read them. The tags contain electronically stored information which can be read from up to several meters away. Since RFID tags are prone to be damaged at high temperatures, the preferred embodiments to include an RFID in the materials all along the processing steps of 106 and 108 are cementiteous composite products, polymer matrix composite products, metal matrix composite products, and paint composite products. However, all the embodiments of the present invention may be RFID tagged, if the tag is not exposed to high temperature processing steps. The RFID tag is either embedded or placed on a surface of the final product 110 as desired and directed.

In another exemplary embodiment, a plurality of tracers are used, wherein tracers having at least one of a chemical and physical signature. These signatures should be exclusive to the tracers, therefore there won't be any interference with the recovered materials 104, and the precursors from which the final product 110 is manufactured. The chemical signature is identifiable using a non-invasive chemical and/or physical detection means such as X-Ray Fluorescence Spectrometry (XRF), X-ray diffraction (XRD), magnetic properties, optical properties, dielectric and ferroelectric properties, acoustical properties, and other physical properties. As a chemical tracer, rare earth oxides, vanadium oxide, molybdenum oxide, tin oxide, and similar oxides that are not normally found in either biomass, and/or the plurality of precursors, are suitable candidates. The same applies to the physical tracers. For products that require high temperature processing in step 108, tracers that can survive and withstand the processing temperatures are to be used, such as rare earth oxides, and color inducing oxides.

According to another embodiment of the present invention, DNA is extracted from the biomass 202 prior to being interacted in step 102 with a plurality of fluids 204. In the cases that the DNA structure of the biomass is not completely destroyed during the interaction and subsequent steps, a sample of the final solid product can be used to match the extracted DNA. This method of identification involves for example the use of a fluorescent based short tandem repeat technique.

In another embodiment of the invention, a UPC barcode is applied to the recovered materials, and followed by recoding/confirmation/recording at each processing step and/or sub-step throughout the production of the final product 110. A barcode reader transmits the times and locations whereby the recovered materials have been combined with a precursor in steps 106, and 108 until when the final product 110 is shipped to its destination. The bar codes upon recognition by a secure network can reveal various information related to the product, such as date of fabrication, manufacturer, amount of recovered material, type of process, and optionally personalized information about the origin of the recovered material. As a result, every product can be traced back to its biomass origin. In one aspect of the present invention, a product 110 can be identified through a managed computerized database, via the use of the plurality of at least one of a RFID tag, a chemical tracer, a physical tracer, DNA, and UPC barcode.

In another aspect of the present invention, a tracer means such as a bar code tag, RFID tag, or any other identification capable means is to be supplied with appropriate packaging materials to a customer by a direct or indirect practitioner of the present invention. The customer may be a funeral home, a crematory, or groups and individuals that are in possession of the biomass 202, or the recovered materials 104. Normally the recovered materials are provided by the funeral homes and/or crematories. The biomass for this particular embodiment, includes a plurality of parts of human or animal origin, wherein the human, or the animal are alive at a time of collecting of the plurality of parts, such as hair, and nails. In addition, the biomass may include parts of human or animal origin, such as hair and nails, wherein the human or the animal are to be buried in-ground. In the case of utilizing a tracer tag, the recipient is instructed to include the tag with the recovered materials 104, or biomass 202. The tags are pre-recorded/registered in a data base system provided by the practitioner prior to be sent to the customers, and all the pertaining information with respect to shipping, receiving, processing, and products are entered into the data base using the tag. This novel arrangement not only provides efficiency, but also provides tractability and accountability of handling and processing the recovered materials and biomass.

In one embodiment of the present disclosure, the plurality of the recovered materials 104 with or without pretreatments may be embedded, encapsulated, be a part of, or integrated into, at least once in a first product of the present invention, wherein the first product comprises at one of a glass, a glass ceramic, a ceramic, a polymer composite, a clay, a polymer, a cement, a metal and a paint, and wherein the product is further combined with a precursor to create at least a second product, and wherein the second product comprises at least one of a glass, a glass ceramic, a ceramic, a polymer composite, a clay, a polymer, a cement, a metal and a paint. Exemplary, is the plurality of the recovered materials 104 combined with a polymer matrix forming precursor 106 to form a polymer matrix first product 110, which in turn is combined with a cementiteous composite forming precursor 106 to form a composite polymer-cement second product 110.

While the foregoing invention has been shown and described with reference to various examples and embodiments, it will be understood that various changes in form and detail may be made therein without departing from the spirit and scope of the instant invention.

What is claimed is:

1. A product, comprising:
   a combination of:
   a plurality of recovered materials, and at least one solid forming precursor material,
   wherein an interaction between biomass and at least one fluid provides said plurality of recovered materials, said biomass being of animal or human origin,
   wherein said at least one fluid in interaction with said biomass provides at least one of degradation of a plurality of organic molecules comprised by said biomass, and breakage of a plurality of protein bonds comprised by said biomass, wherein said at least one fluid comprises an alkaline solution,
   and
   wherein the combination of said plurality of the recovered materials and said at least one solid forming precursor material forms the product into a solid object.

2. The product of claim 1, wherein the solid object being one of a shaped article, an art form, an ornamental form, a functional article, a jewelry, a block, a building product, a painted article, a composite article, a glass article, a ceramic article, a glass-ceramic article, a clay article, a cementiteous article, a reinforced fiber article, a metallic article and a combination thereof.

3. The product of claim 1, wherein said at least one solid forming precursor material is selected from a group comprising glass forming precursors, ceramic forming precursors, glass-ceramic forming precursors, crystal forming precursors, composite forming precursors and a combination thereof.

4. The product of claim 3, wherein said composite forming precursors are selected from a group comprising a paint composite forming precursor, a clay composite forming precursor, a cementiteous composite forming precursor, a polymer matrix composite forming precursor, a metal matrix composite forming precursor, a polymer composite forming precursor, a wood composite forming precursor, a combustible material composite forming precursor, an ink composite forming precursor, a dye composite forming precursor, a composite for filling 3D printer cartridges, and a combination thereof.

5. The product of claim 1, wherein said interaction between the biomass and the at least one fluid is at least one of:
- a chemical interaction;
- a physical interaction;
- a thermal interaction;
- a mechanical interaction;
- a high temperature reaction;
- a wet oxidation reaction;
- a dissociation reaction;
- a dissolution action;
- a dissolving action;
- a rinsing action;
- a soaking action;
- a spraying action;
- a washing action;
- a dedusting action;
- a cleaning action;
- a drying action;
- a physical removal action;
- a size reducing action;
- a separating action;
- a combustive interaction, and
- a combination thereof.

6. The product of claim 5, wherein interactions, reactions and actions occur under one of:
- atmospheric conditions;
- hydrothermal conditions; and
- supercritical conditions.

7. The product of claim 1, wherein said biomass comprising at least one of human or animal derived tissue, a human cadaver, human remains, a plurality of bone fragments, a plurality of materials of human origin, a plurality of materials of animal origin, an animal carcass, cremation ash, cremation remains, articles and parts originating from a human or animal.

8. The product of claim 1, wherein said biomass comprising at least one of hair, nail clippings, and matter derived from a human or animal.

9. The product of claim 1, wherein said biomass comprising one of a plurality of parts of a deceased human and a plurality of parts of deceased animal.

10. The product of claim 1, wherein said at least one fluid further comprising at least one of a gas, air, a vapor, an aerosol, a liquid, a slurry and a combination thereof.

11. The product of claim 10, wherein said vapor and said gas comprising at least one of steam, water, vapor, ammonia, and a combination thereof.

12. The product of claim 10, wherein said at least one fluid further comprises at least one of, a plurality of organic solvents, a plurality of amino-acids, hydrogen peroxide, carbonates, bicarbonates, salts, soaps, water, and a plurality of acids.

13. The product of claim 1, wherein the product further comprising a plurality of additives.

14. The product of claim 1, wherein the at least one solid forming precursor material is at least one of an oxide material, and a non-oxide material.

15. The product of claim 1, wherein a weight percentage of the plurality of recovered materials in the product is from about 0.001 wt % to about 90 wt %.

16. The product of claim 1, wherein the product comprises a traceability means selected from a microchip, a chemical tracer, a physical tracer, a radio frequency identifier (RFID), a UPC bar code, a DNA marker, and a combination thereof.

17. A method for forming a product, comprising:
interacting a biomass and at least one fluid to provide a plurality of recovered materials, said biomass being of animal or human origin, wherein said at least one fluid comprises an alkaline solution,
wherein said interacting step comprising at least one of degrading a plurality of organic molecules comprised by said biomass, and breaking a plurality of protein bonds comprised by said biomass, and
combining the plurality of recovered materials with at least one solid forming precursor material to form the product
wherein the combination of said plurality of the recovered materials and said at least one solid forming precursor material forms the product into a solid object.

18. A system, comprising:
a combination of a plurality of products,
wherein each of said plurality of products comprising:
a plurality of recovered materials, and at least one solid forming precursor material,
wherein an interaction between biomass and at least one fluid provides said plurality of recovered materials, said biomass being from animal or human origin, wherein said at least one fluid comprises an alkaline solution,
wherein said at least one fluid in interaction with said biomass provides at least one of degradation of a plurality of organic molecules comprised by said biomass, and breakage of a plurality of protein bonds comprised by said biomass, and
wherein the combination of said plurality of the recovered materials and said at least one solid forming precursor material forms each of said plurality of products into a solid object.

* * * * *